United States Patent
Lee et al.

(10) Patent No.: US 7,697,755 B2
(45) Date of Patent: Apr. 13, 2010

(54) METHOD FOR ROBUST ANALYSIS OF BIOLOGICAL ACTIVITY IN MICROSCOPY IMAGES

(75) Inventors: Shih-Jong J. Lee, Bellevue, WA (US); Samuel Alworth, Seattle, WA (US)

(73) Assignee: DRVision Technologies LLC, Bellevue, WA (US)

( * ) Notice: Subject to any disclaimer, the term of this patent is extended or adjusted under 35 U.S.C. 154(b) by 1403 days.

(21) Appl. No.: 10/952,579

(22) Filed: Sep. 29, 2004

(65) Prior Publication Data

US 2006/0072817 A1   Apr. 6, 2006

(51) Int. Cl.
*G06K 9/00* (2006.01)
*G06K 9/34* (2006.01)
*G06K 9/62* (2006.01)
*G06K 9/46* (2006.01)
*G06K 9/66* (2006.01)
*G01N 33/53* (2006.01)

(52) U.S. Cl. .................. 382/173; 382/133; 382/190; 382/159; 435/7.1

(58) Field of Classification Search .............. 435/7; 382/128–133, 155–160, 224–228
See application file for complete search history.

(56) References Cited

U.S. PATENT DOCUMENTS

| | | |
|---|---|---|
| 5,867,610 A | 2/1999 | Lee |
| 5,989,835 A | 11/1999 | Dunlay et al. |
| 6,631,212 B1 * | 10/2003 | Luo et al. .................. 382/228 |
| 6,999,620 B1 * | 2/2006 | Harville ...................... 382/173 |
| 2002/0031268 A1 * | 3/2002 | Prabhakar et al. ............ 382/224 |
| 2003/0036855 A1 | 2/2003 | Harris et al. |
| 2003/0069652 A1 | 4/2003 | Lee |
| 2004/0022438 A1 * | 2/2004 | Hibbard ..................... 382/199 |
| 2004/0042651 A1 * | 3/2004 | Ii et al. ....................... 382/159 |
| 2004/0139103 A1 * | 7/2004 | Boyce et al. ................ 707/102 |
| 2006/0133666 A1 * | 6/2006 | Liu et al. .................... 382/159 |

OTHER PUBLICATIONS

Borenstein, "Combining Top-down and Bottom-up Segmenation", Jun. 2004, Computer Vision and Pattern Recognition Worshop 2004, IEEE.*
Tap Taps MAIA Scientific's Imaging System to Enable Automated Cell Culture for Well Plates, in Inside Bioassays vol. 1(4) pp. 1-5.
Elias Zerhouni, The NIH Roadmap, in Science vol. 302(3) pp. 63-64 and 72, Oct. 2003.
Stuart Schreiber, biology from a chemist's perspective in DDT vol. 9(7) Apr. 2004, pp. 299-303.
Carpenter, Sabatini, Systematic Genome-Wide Screens of Gene Function, in Genetics vol. 5 pp. 11-22, Jan. 2004.
Zhang et al, Simple Statistical Parameter for Use in Evaluation and Validation of High Throughput Screening Assays, in J of Biom Scr vol. 4(2) pp. 67-73.
Numerical Recipes in C: The Art of Scientific Computing (ISBN 0-521-43108-5) Cambridge University Press 1992, pp. 699-706.

* cited by examiner

*Primary Examiner*—Matthew C Bella
*Assistant Examiner*—Nathan Bloom

(57) ABSTRACT

An object analysis method performs object segmentation to generate segmentation confidence map and uses the segmentation results to generate robust object features. The robust object features are combined to create robust FOV summary features, robust sample summary features and robust assay summary features.

4 Claims, 16 Drawing Sheets

METHOD FOR ROBUST ANALYSIS OF BIOLOGICAL ACTIVITY IN MICROSCOPY IMAGES

TECHNICAL FIELD

This invention relates to methods for the automated or semi-automatic analysis of biological activity in microscopy images from life sciences applications that can consistently achieve high detection sensitivity with high specificity, reproducibility and accuracy.

BACKGROUND OF THE INVENTION

High content, quantitative analysis of microscopy images is an increasingly important tool for applications in drug discovery, basic research and medical diagnosis. We define image based, high content analysis to mean the measurement of multiple image parameters per cell or subcellular compartment or objects, across multiple cells in an image, or across multiple images. This could be done automatically in a high volume and high throughput manner or in a research setting that involves few cells or images in a semi-automatic fashion. High content analysis of these assays has only become practical in drug discovery and medical diagnosis in recent years, and is currently being adopted in basic research.

Prior to the advent of high content screening systems, prior art approaches in cell based screening only analyzed a single average fluorescent response of many hundreds of cells in a biological sample, usually contained in a microtiter well. A popular assay instrument that uses this approach is the Molecular Devices FLIPR (www.moleculardevices.com). High content screening tools in drug discovery have been deployed since the late 1990s. These individual cell based assays provide researchers with large amounts of biological and chemical information, and they offer important enhancements to information obtained through traditional high throughput screens. High content assays have to date been mostly deployed to screen chemical compounds against biological targets (usually receptors) genetically over-expressed in cell culture. More recently, high content assays have been increasingly adopted in target discovery; an important and popular application is RNA interference (RNAi) assays. The same imaging equipment and image informatics can be used in either case. High content analysis enables the measurement of complex and biologically important phenotypes that could not be measured in HTS, such as morphology changes, cellular differentiation, cytoskeletal changes, cell to cell interactions, chemotaxis and motility, and spatial distribution changes like receptor trafficking or complex formation.

Recently, high content analysis has become vital to cell culture automation, which has been identified as a critical bottleneck in both high content and high throughput screening. Here cell image analysis could be adapted to measure cells in microplates, count the cells, measure the confluence of cells, and the purity of cell culture (single or multiple clones). An example of this is a recent collaboration announced between MAIA Scientific and The Automation Partnership ("TAP Taps MAIA Scientific's Imaging System to Enable Automated Cell Culture for Well Plates" in Inside Bioassays Vol. 1(4) pg 1-5) to add Maia's image analysis software to the Cello automated cell culture system.

Chemical compound screening and RNAi based protein screening are accelerating the adoption of high content image based analysis in academic and basic research settings. Of course, microscopy has long been a benchtop tool for biologists, but until recently acquiring images using camera and analysis of those images has typically been low volume, low throughput, semi automatic with manual Region Of Interest (ROI) drawing and application of simple measurement tools included with standard digital microscopy software packages such as Universal Imaging's Metamorph, NIH Image, and MediaCybernetics' ImagePro. This appears to be changing as the NIH makes a strong push into chemical compound screening for academics. The Molecular Libraries and Molecular Imaging initiative (http://nihroadmap.nih.gov/molecularlibraries/index.asp) is a key component of the new NIH Roadmap (Zerhouni in Science Vol. 302(3) pg. 63-64 and 72, October 2003) and will offer public sector biomedical researchers access to small organic molecules which can be used as chemical probes to study cellular pathways in greater depth. It is intended for these assays to make use of high content and high throughput screening approaches, and NIH funding will likely favor researchers who adopt these types of tools. Probably a guiding case for the MLMI initiative, the NCI funded Harvard Institute for Chemistry and Cell Biology Initiative for Chemical Genetics (Stuart Schreiber: biology from a chemist's perspective in DDT Vol. 9(7) April 2004, pg. 299-303) has been using high content analysis of chemical compound screens for some time. They use chemicals in an analogous way to mutations, to dissect cellular pathways and identify previously unknown pathway components.

Very recently, RNAi has been validated as a platform technology for the analysis of protein function, and these assays benefit immensely from high content analysis to interpret the phenotypic changes of a sample subject to genetic perturbation (Carpenter, Sabatini, SYSTEMATIC GENOME-WIDE SCREENS OF GENE FUNCTION, in Genetics Vol. 5 pg. 11-22, January 2004). In the near future, genome wide screens will be commonplace. Several consortia (Netherlands Cancer Institute/Cancer Research UK, Vienna's Research Institute of Molecular Pathology/EMBL/Sanger Institute, Cold Spring Harbor Laboratories, and the RNAi consortium) have announced plans to make RNAi collections for the entire human genome. The Sloan-Kettering Institute and GE Healthcare have recently begun a collaboration to develop a technology capable of scanning the entire human genome in one day to analyze the function of each of the bodies 35,000 genes in a cellular process (see www.amersham.co.uk/investors/IR03/rep-4.html). This gene scanning technology will depend heavily on high content analysis software disclosed in "Harris et al. US Patent Application no. 2003/0036855 Method and Apparatus for Screening Chemical Compounds". Gene scanning will be made available to the broad academic community via a low-end hardware and optics platform that uses the same high content analysis software, a trend that indicates the growing importance of analytical software relative to hardware and optics platforms that are becoming commoditized.

There are many prior art approaches of cell analysis. "Lee, Shih-Jong J. U.S. Pat. No. 5,867,610 Method for Identifying Objects Using Data Processing Techniques, February 1999" discloses a method for the analysis of images of cervical Pap smear slides that enabled the first fully automated and FDA approved Pap smear screening device. In drug discovery, high content screening systems utilize advanced fluorescence light-microscopy and molecule specific fluorescent-protein tags to directly examine the physiology of fixed and living cells. Leading examples of state of the art devices are disclosed in "Harris et al. US Patent Application no. 2003/0036855 Method and Apparatus for Screening Chemical Compounds" and "Dunlay et al. U.S. Pat. No. 5,989,835 System for Cell Based Screening, November 1999".

The de facto standard for measuring assay quality in high throughput and high content screens is the z factor, disclosed in "Zhang et al, A Simple Statistical Parameter for Use in Evaluation and Validation of High Throughput Screening Assays, in Journal of Biomolecular Screening Vol. 4(2) pg. 67-73, 1999". Recently, it has been proposed that the Z factor also be used as a measure of quality for the new screens of RNAi induced phenotypes as well (Carpenter, Sabatini, SYSTEMATIC GENOME-WIDE SCREENS OF GENE FUNCTION, in Genetics Vol. 5 pg. 11-22, January 2004). It is reasonable to assume that the Z factor will see widespread use in academia as high throughput, high content assays are adopted.

The Z factor measures the assay signal window with a dimensionless parameter. The signal window can be thought of as the separation band between the distribution of test samples and that of control samples. This window is important to reduce false positive and false negative results. The Z factor is defined as:

$$Z = 1 - \frac{(3\sigma_s + 3\sigma_c)}{|\mu_s + \mu_c|}$$

where $\sigma_s$ and $\sigma_c$ indicate the standard deviation of the sample and control populations respectively, and $\mu_s$ and $\mu_c$ indicate the mean of the sample and control populations respectively. As discussed in Zhang et al., the Z factor is sensitive to both data variability and the signal dynamic range. For example, as $(3\sigma_s+3\sigma_c)$ approaches zero (very small standard deviations), or as $|\mu_s-\mu_c|$ approaches infinity (large signal dynamic range), the Z-factor approaches 1, and the HTS assay approaches an ideal assay. Typically, an excellent assay is one that has a Z factor score greater than 0.5.

Assay development can be thought of as an exercise in optimization of many assay inputs to deliver the highest possible Z factor either by increasing signal range or reducing variation. There are many potential sources of variation, though scientists tend to focus on biological variation rather than instrument variation as that is what they can directly control. Sources of biological variation include subtle differences in cells resulting from cell culture variation, differences in DNA transfection across cells, variation in imaging probe titer and probe characteristics (such as rate of dissipation) across cells, errors in liquid handling, and poor cell adhesion. Furthermore, high content measurements can be confounded by compound related artifacts that can cause false positives and false negatives; such as fluorescent compounds, toxic compounds and rare morphological changes that affect the biological signal on which the assay is based.

Indeed, the evaluation of high content assay quality is fundamentally different than that of HTS assay quality because the sample unit is different. In HTS the sample is a single fluorescent measurement corresponding to microtiter well. In a high content assay, the sample is a biological object upon which a measurement or set of measurements, including combined and higher order measurements, are made using high content image analysis. There can be hundreds of objects in a FOV, and many FOVs per well, slide or cell array. Thus, high content analysis introduces a new source of variation into the measurement of assay quality: image analysis.

To date there has been no discussion in the literature or marketplace about how robust methods can be applied to high content analysis to both reduce measurement variation and increase the signal strength. It would be greatly beneficial to the field if robust methods could be deployed that yield a high quality assay while allowing the same or even more variation in assay inputs. This is possible in high volume, high throughput, microscopy image based assays because the high content image analysis plays a direct role in establishing both the signal dynamic range and the population variation.

Fundamentally, high content image analysis techniques can be used to reduce measurement variation at the sample level. Current state of the art approaches have in common the production of a binary mask. A binary mask image is a 1 bit image composed of ones (foreground) and zeros (background). The binary mask image corresponds to an input image of a high content assay wherein image segmentation has been applied. Image segmentation is the association of pixels to biological objects (e.g. cells or subcellular components). In the binary mask image the white areas (filled with ones) correspond to objects, and the black areas (filled with zeros) corresponds to the background. Object based measurements are carried out using the original input image within the region defined by the binary masks or their surrounding regions often subject to adjustments such as a correction for the non-uniform response of the imaging system across the field of view or transformation from intensity value to optical density. Common object based measurements include total intensity, average intensity, and standard deviation of intensity within the object region. Many other morphological features such as shape, texture and color measurements can also be made.

As described in "Harris et al. US Patent Application no. 2003/0036855 Method and Apparatus for Screening Chemical Compounds, the basic cell mask can be used to take measurements of nuclear and cytoplasmic activity. One example is for a two image fluorescent assay wherein one image corresponds to an emission filter channel that displays a Hoechst nuclear marker and a second image corresponding to a fluorescent reporter molecule describing some biological activity located in the cytoplasm. Object masks can be created by a simple threshold based segmentation algorithm applied to the Hoechst image, thus each object corresponds to the a cell nuclear region as the intensity in the Hoechst image displays only intensity located in the cell nucleus. An erosion image processing operation can be applied to these masks to create the nuclear mask. These masks can be used to measure the nuclear intensity in the corresponding regions of the Hoechst image. Next to measure cytoplasmic activity in the second image, a mask to represent the cytoplasm area must be created. To do this a dilation operation using preset parameters is applied to the original binary mask image, and areas that were one (1) in the original mask area are set to zero (0). The result is a donut shaped mask, these masks are used to measure cytoplasmic intensity in the corresponding regions of the second fluorescent image.

A similar method is disclosed in "Dunlay et al. U.S. Pat. No. 5,989,835 System for Cell Based Screening" and two examples of determining nuclear translocation of a DNA transcription factor are discussed. Firstly, an unstimulated cell with its nucleus labeled with a blue fluorophore and a transcription factor in the cytoplasm labeled with a green fluorophore. Secondly, the nuclear binary masks are created by performing cells segmentation on the fluorescent image corresponding to the blue fluorophore. The cytoplasm of the unstimulated cell imaged at a green wavelength. The nuclear mask is eroded (reduced) once to define a nuclear sampling region with minimal cytoplasmic distribution. The nucleus boundary is dilated (expanded) several times to form a ring that is 2-3 pixels wide that is used to define the cytoplasmic sampling region for the same cell. Using the nuclear sampling region and the cytoplasmic sampling region, data on nuclear translocation can be automatically analyzed by high content analysis on a cell by cell basis.

Binary mask based high content measurements introduce error into the assay at an early stage, in addition to instrument error such as focusing errors and variation in illumination. Types of measurement error are shown in FIG. 1A-4H. FIG. 1A-1D show errors in measurement on the nuclear image. The dark regions 104, 106 are the binary masks resulting from segmentation. The true nuclear regions 100, 102 are highlighted in checker patterns. Measurement errors result from segmentation errors that include over-segmentation (FIG. 1A), under-segmentation (FIG. 1B), missed segmentation (FIG. 1C) and overlapped segmentation (FIG. 1D). As described above, the nuclear masks 104, 106, 108 are used to derive cytoplasm rings 112, 114, 116 within which measurements are made on the cytoplasm regions 110, 118. FIGS. 1E-1H show how errors in measurements on the cytoplasm image accumulate from the initial segmentation errors made when creating the nuclear masks 104, 106, 108. The cytoplasmic rings 112, 114, 116 are shown in dark black overlain on the representation of the true nuclear 100, 102 (checker patterns) and cytoplasm regions (dotted patterns). As disclosed above, cytoplasmic region measurements are meant to measure the fluorescent activity of fluorophores in the cytoplasm, however types of common measurement errors include measuring both the true cytoplasm and true background intensities within the cytoplasm ring region 112 (FIG. 1E), measuring intensities corresponding to true cytoplasm, true background and true nuclear regions within the cytoplasm ring region 114 (FIG. 1F), missing the object altogether, and the cytoplasm ring region 116 measuring the cytoplasm intensity of two cells and treating it as one (FIG. 1H). This error is again accumulated and undermines derived measurements such as the standard deviation of intensity, the ratio of cytoplasmic to nuclear intensity, etc.

Similar error is accumulated in time lapse images when objects are not perfectly aligned from frame to frame. Error is introduced when the nuclear object reference mask and the true nuclear object shift over time. As the nucleus shifts from image frame to image frame, the measurement region corresponding to the initial binary mask increasingly includes background fluorescence in its measurement.

These fundamental errors in object segmentation and measurement are propagated throughout the assay's statistics resulting in higher assay variability and reduced signal dynamic range. Additional variation is introduced by instrument and biological variation. It is clear then that there is a need for robust methods of high content analysis that allow for a more accurate segmentation result, and more specific and sensitive measurements with high repeatability. These robust measurements are needed not only at the individual object level, but also at the FOV level, the sample level (usually corresponding but not limited to a microtiter plate well or slide bound tissue specimen or micro tissue array) and the assay level.

OBJECTS AND ADVANTAGES

This invention provides a method to reduce measurement variations and improve measurement repeatability. The robust method can be applied at different levels of cellular analysis to achieve high detection sensitivity with high specificity, reproducibility, and accuracy. The input to a robust analysis step at a given level does not have to be the result of a preceding robust analysis step and the robust result of one level can be processed by a non-robust analysis step. The robust methods include object segmentation confidence mapping, confidence based measurements, features from robust estimation, FOV regulated feature extraction, sample regulated feature extraction, assay regulated feature extraction.

These novel, robust approaches will reduce assay outcome variation while allowing the same or perhaps even more variation in assay inputs. This will allow scientists to relax many of the assay input constraints heretofore restricted to improve high content assay quality such as cell culture constraints, DNA transfection quality, limitations on probe titer and characteristics, and automation constraints. This will result in a faster, easier and cheaper high throughput assay set up.

The primary objective of the invention is to apply robust method to reduce measurement variations and improvement measurement repeatability. A secondary objective is to provide object segmentation confidence map rather than binary segmentation masks to reduce measurement error and allows confidence based measurements. Another objective of the invention is to allow the application of robust methods at different levels of cellular analysis. The fourth objective of the invention is to allow object features to be regulated by the FOV. The fifth objective of the invention is to allow FOV features to be regulated by the sample. The sixth objective of the invention is to allow sample features to be regulated by the assay.

SUMMARY OF THE INVENTION

A robust object segmentation method for analysis of biological activity receives an input image and performs segmentation confidence mapping using the input image to generate segmentation confidence map output. A thresholding is performed using the object segmentation confidence map to generate a high confidence object mask output.

An object segmentation confidence mapping method for analysis of biological activity receives an input image and performs segmentation decision to create segmentation decision result. A difference operation is performed to generate the segmentation decision result. A confidence mapping is performed using the difference result to generate segmentation confidence.

An object level robust analysis method for biological activity receives an input image and performs object segmentation using the input image to create object segmentation result. A robust object feature measurement is performed to generate robust object feature result.

An FOV level robust analysis method for biological activity receives a plurality of object feature results and performs robust FOV summary feature extraction to create robust FOV summary features. A FOV regulated feature extraction is performed to generate FOV regulated features.

A FOV regulated feature extraction method for biological activity receives a plurality of object feature results and performs control object selection using the plurality of object feature results to generate control objects output. A FOV regulated feature extraction is performed to generate FOV regulation features output. An object feature FOV regulation is performed using the plurality of object feature results and the FOV regulation features to generate FOV regulated object features output.

A sample level robust analysis method for biological activity receives a plurality of FOV feature results and performs robust sample summary feature extraction to create robust sample summary features. A sample regulated feature extraction is performed to generate sample regulated features.

An assay level robust analysis method for biological activity receives a plurality of sample feature results and performs robust assay summary feature extraction to create robust assay summary features. An assay regulated feature extraction is performed to generate assay regulated features.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenario

Figure 1:
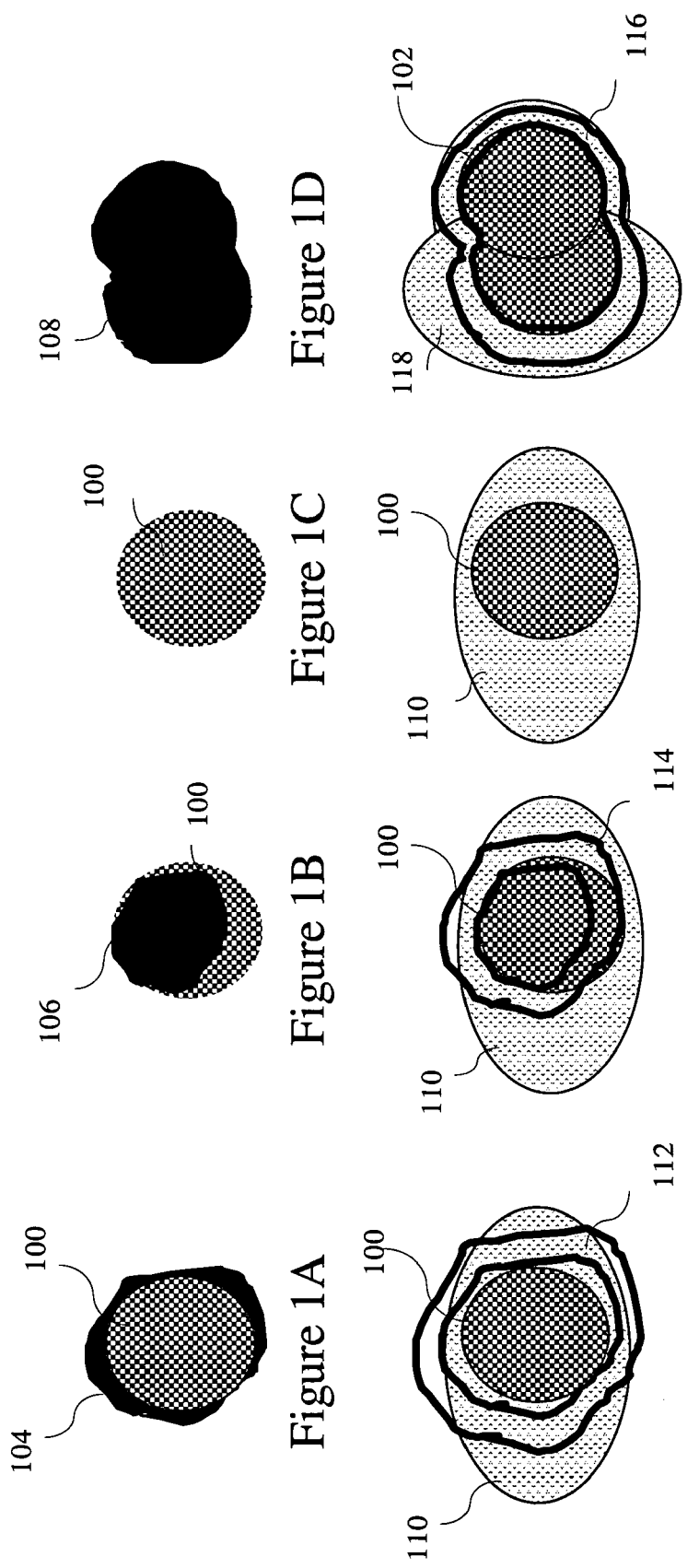
FIG. 1A shows a true nuclear region and the binary mask of over-segmentation.
FIG. 1B shows a true nuclear region and the binary mask of under-segmentation.
FIG. 1C shows a true nuclear region and the binary mask of missed segmentation.
FIG. 1D shows the binary mask overlapped segmentation.
FIG. 1E shows the true nuclear region, the true cytoplasm region and its cytoplasm ring for FIG. 1A.
FIG. 1F shows the true nuclear region, the true cytoplasm region and its cytoplasm ring for FIG. 1B.
FIG. 1G shows the true nuclear region, the true cytoplasm region and the missing cytoplasm ring for FIG. 1C.
FIG. 1H shows the true nuclear region, the true cytoplasm region and its cytoplasm ring for FIG. 1D.
Figure 2:
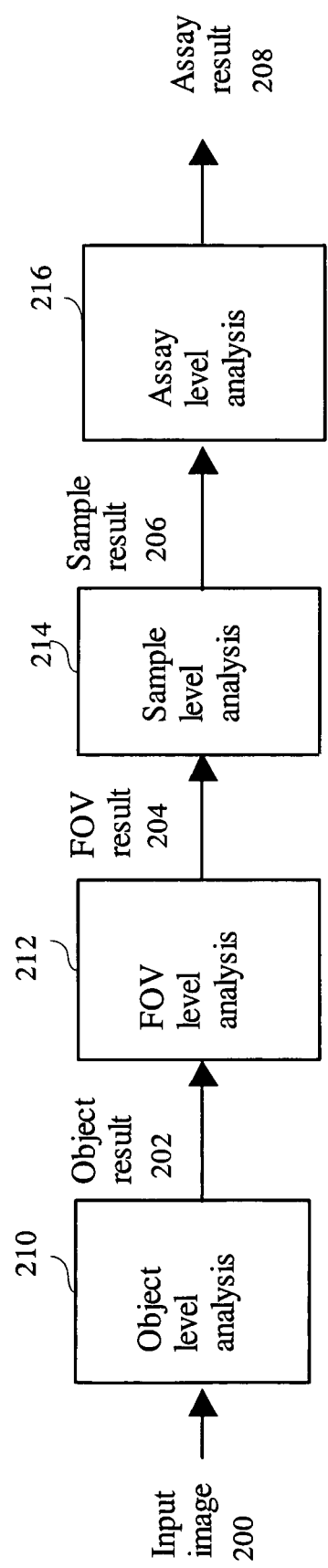
FIG. 2 shows the processing flow for a cellular analysis application consisting of a plurality of processing levels.

The robust method can be applied at different levels of cellular analysis to achieve high detection sensitivity with high specificity, reproducibility, and accuracy. FIG. 2 shows multiple processing levels for a cellular analysis assay. A cellular analysis assay consists of at least one or a plurality of processing levels 210, 212, 214, 216. As shown in FIG. 2, at least one input image 200 is processed by an object level analysis step 210. The input image 200 could contain more than one channels such as images of different spectrum, florescence stained image, nucleus stained image, phase contrast image, Difference Interference Contrast (DIC) image, images of different focal planes, or time lapse images containing different temporal sampling of the objects of interest, etc. The object level analysis step 210 detects, segments, and measures the objects of interest to create the object result 202. An object could be a tissue section, a cell, a nucleus, a sub-cellular component, or other resolvable biological object. The object result 202 could contain one or more of the attributes such as object location, object mask, object feature measurements, etc. The Field Of View (FOV) level analysis step 212 processes the object result 202 from objects contained in the same FOV to create a FOV result 204 output. A FOV often contains a plurality of objects. In one embodiment of the invention, a FOV corresponds to the size of an image. The FOV result could contain one or more of the attributes such as FOV object counts, FOV object feature population statistics, FOV object relational features, etc.

The sample level analysis step 214 processes the FOV result 204 from the FOVs contained in the same sample to create a sample result output 206. A sample often contains a plurality of FOVs. In one embodiment of the invention, a sample corresponds to a well in a well plate based high throughput/high content screening assays. In another embodiment of the invention, a sample corresponds to an element of a tissue array, or a slide in a slide based assay. The sample result 206 could contain one or more of the attributes such as sample object counts, sample object feature population statistics, sample FOV feature population statistics, etc. The assay level analysis step 216 processes the sample results from the samples contained in the same assay to create an assay result output 208. An assay often contains a plurality of samples. In one embodiment of the invention, an assay corresponds to a 384 well plate in a well plate based high throughput/high content screening assays. In another embodiment of the invention, an assay corresponds to a set of slides in a multiple slide based assays. In yet another embodiment of the invention, an assay corresponds to a micro tissue assay. The assay result could contain one or more of the attributes such as assay object counts, assay object feature population statistics, assay sample feature population statistics, etc.

The robust cellular analysis methods of this invention include robustness enhancement for each of the plurality of processing levels to improve the sensitivity, specificity, reproducibility, and accuracy of cellular analysis.

Figure 3:
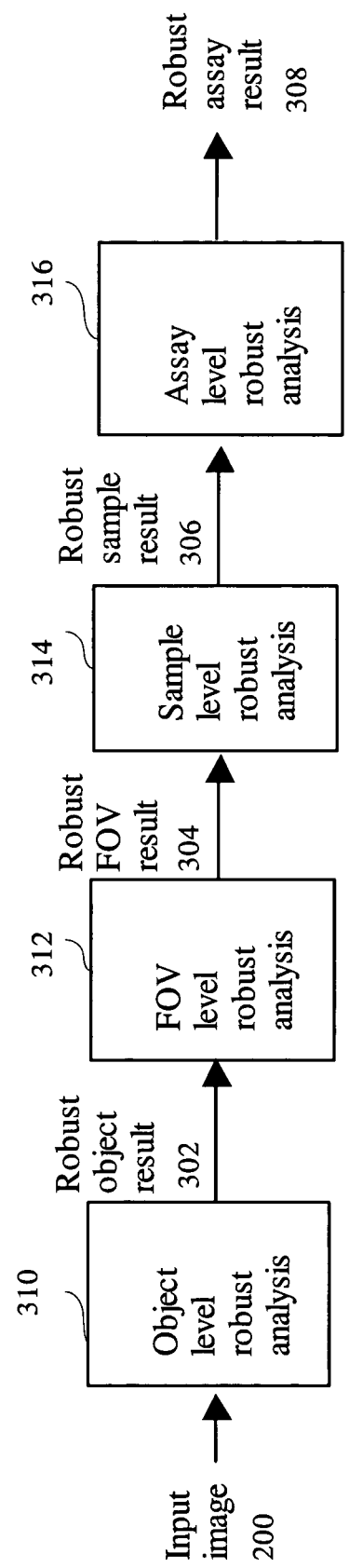
FIG. 3 shows the processing flow for the robust cellular analysis for a plurality of processing levels.

As shown in FIG. 3, the input image 200 is processed by the object level robust analysis step 310 to create a robust object result 302. The robust object result 302 is processed by the FOV level robust analysis step 312 to create a robust FOV result 304. The robust FOV result 304 is processed by the sample level robust analysis step 314 to create the robust sample result 306. The robust sample result 306 is processed by the assay level robust analysis step 316 to create a robust assay result 308.

Figure 4:
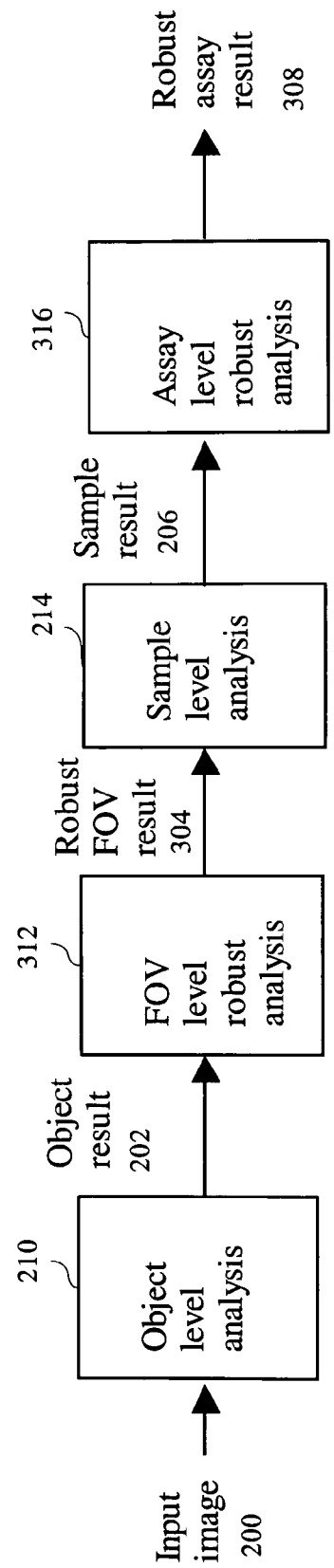
FIG. 4 shows the processing flow for an alternative robust cellular analysis method.

Note that the input to a robust analysis step at a given level does not have to be the result of a preceding robust analysis step and the robust result of one level can be processed by a non robust analysis step. FIG. 4 shows such an example. As shown in FIG. 4, the input to the FOV level robust analysis 312 is the object result output 202 from the non-robust object level analysis step 210. On the other hand, the robust FOV result 304 is processed by a non-robust sample level analysis step 214. The resulting sample result 206 is in turns processed by an assay level robust analysis step 316 to create robust assay result output 308.

Those skilled in the art should recognize that other coupling of different level robust and non-robust cellular analysis steps and their variations are anticipated and are within the scope of this invention.

II. Object Level Robust Analysis

Figure 5:
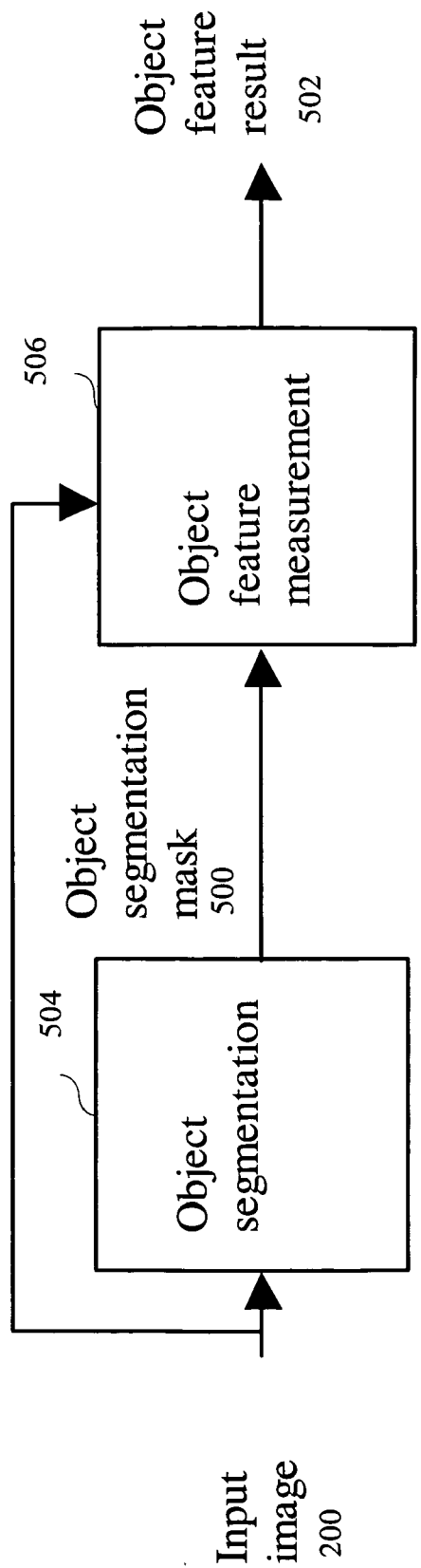
FIG. 5 shows the processing flow for the object level analysis method.

In one embodiment of the invention, the object level analysis step includes two steps: an object segmentation step 504 and an object feature measurement step 506. The object, segmentation step 504 detects the object of interest region from input image(s) 200 and generates a binary mask containing the object of interest, the object segmentation mask 500. The object feature measurement step 506 uses the object segmentation mask 500 and the input image 200 to calculate object features of interest to be included in the object feature result output 502. The processing flow of the object level analysis method is shown in FIG. 5.

Figure 6:
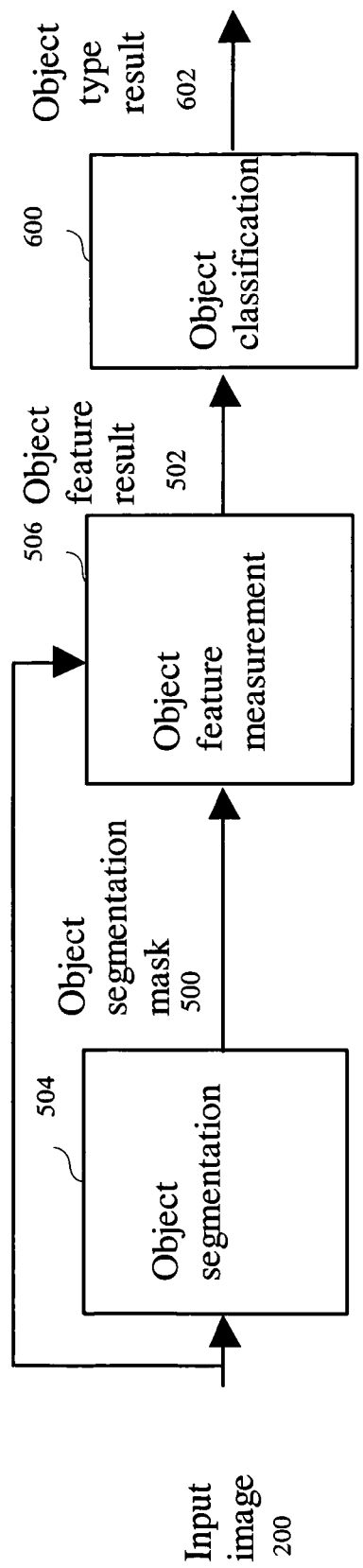
FIG. 6 shows the processing flow for an alternative object level analysis method.

In another embodiment of the invention, the object level analysis step includes an object classification step 600. As shown in FIG. 6, the additional object classification step 600 inputs the object feature result 502 and performs object classification 600 to classify the object into an object type 602 (predefined or automatically determined). The object classification step 600 could be performed automatically using a pattern classification method such as the regulation decision tree disclosed in Shih-Jong J. Lee, "Regulation of Hierarchic Decisions in Intelligent Systems", US patent application publication no. 20030069652-A1, Apr. 10, 2003. It could also include semi-automatic classification involving human in the classification or classification review and correction. One of the object types may include artifact that should not be considered in the follow-on processing. Another object type may include control object that should be used for regulated feature extraction to be described later.

II.1 Robust Object Segmentation

Prior art object segmentation process creates binary object segmentation mask. The images suitable for computer processing have to be digitized into digital images. The digitalization process represent an image as a set of pixels (picture elements), each pixel has an intensity value. Due to the digitalization effect, the true boundary of an object may not coincidence with a pixel boundary. It could fall inside a pixel and cover part of the pixel region. The portion of pixel that is covered could change due to slight position shift.

The prior art object segmentation method that creates binary object segmentation mask makes an in-object/off-object decision for each pixel. This process is inherently inaccurate and is not repeatable because of the hard decision to be made at a pixel level. This effect could be very significant when an object is small since most of its pixels could be considered boundary pixels after digitization. The boundary pixels are the ones that most likely to be impacted by the effect of shift.

Figure 7B:
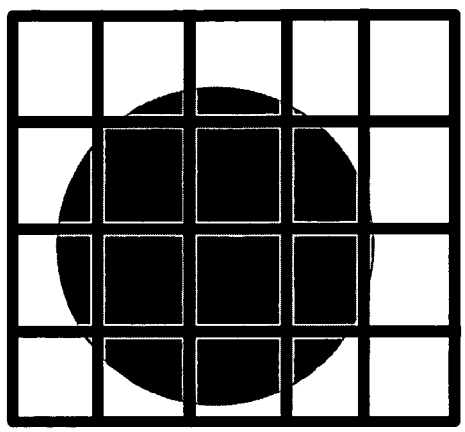
FIG. 7B illustrates a slightly shifted circle overlaid on the digitization pixel grid.
Figure 7D:
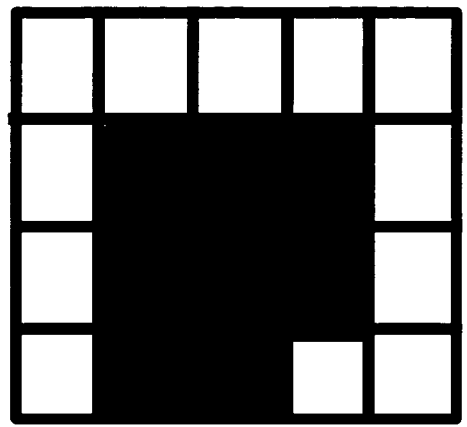
FIG. 7D illustrates a segmentation mask for FIG. 7B.
Figure 7A:
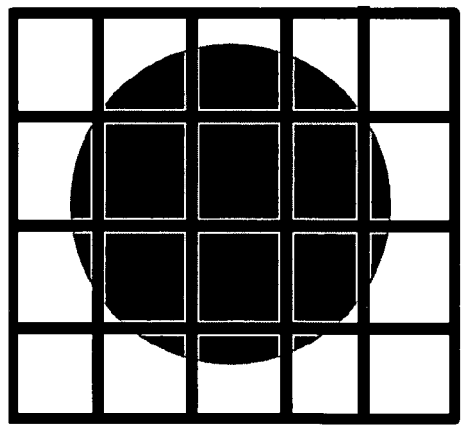
FIG. 7A illustrates a circle overlaid on a digitization pixel grid.
Figure 7C:
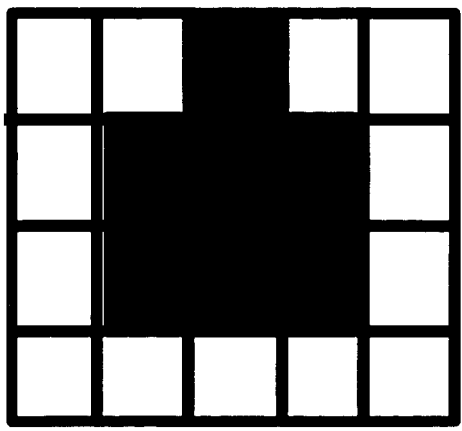
FIG. 7C illustrates a segmentation mask for FIG. 7A.

FIG. 7A shows a circle overlaid on a digitization pixel grid. A segmentation method is likely to create a segmentation mask as shown in FIG. 7C. FIG. 7B shows a slightly shifted same size circle that is overlaid on the digitization pixel grid. A segmentation method is likely to create a segmentation mask as shown in FIG. 7D. As can be appreciated from the illustration, the segmentation masks of FIG. 7C and FIG. 7D are significantly different even though the difference between the two circles are just a slight shift. The object feature measurements based on the segmentation mask could be quite different. For example, the size of circle will be 7 pixels based on the segmentation mask of FIG. 7C. It will be 8 pixels based on the segmentation mask of FIG. 7D. So the difference is over 10%.

The robust object segmentation method of the invention creates a segmentation confidence map rather than a binary mask for each object. The segmentation confidence map 800 can be thresholded to create a high confidence mask 802 and a low confidence mask 804. The high confidence mask 802 includes pixels that are most likely contained in the object. The low confidence mask 804 contains all pixels that could contain part of the object. The high confidence object mask 802 is good for displaying the segmentation results or to be used as the binary segmentation mask for object feature measurement. The low confidence object mask along with the segmentation confidence map support robust object feature measurements.

Figure 8:
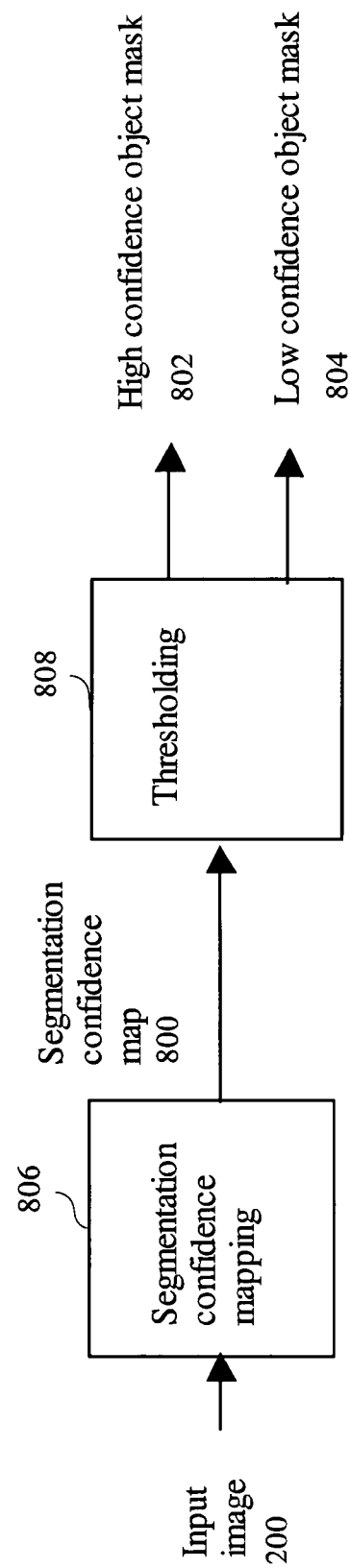
FIG. 8 shows the processing flow for the robust object segmentation method.

The processing flow for the robust object segmentation method is shown in FIG. 8. As shown in FIG. 8, the segmentation confidence mapping step 806 processes the input image 200 to generate a segmentation confidence map 800. The segmentation confidence map 800 is processed by a thresholding step 808 to generate a high confidence mask 802 and/or a low confidence mask 804.

Figure 9:
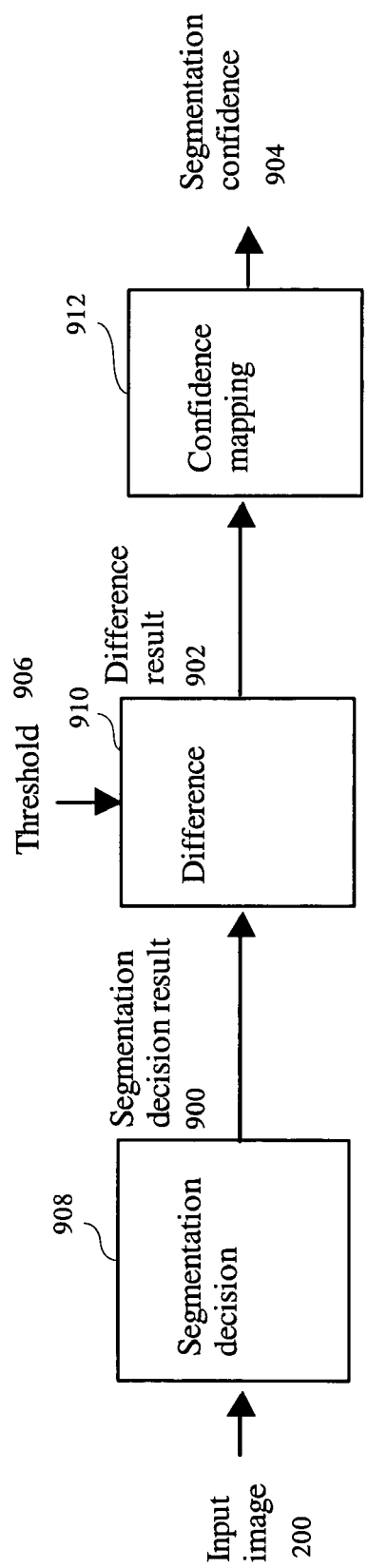
FIG. 9 shows the processing flow for the object segmentation confidence mapping method.

In one embodiment of the invention, the processing flow of the object segmentation confidence mapping method is shown in FIG. 9. As shown in FIG. 9, the input image 200 is processed by a segmentation decision step 908 to generate a segmentation decision result output 900. A difference step 910 processes the segmentation decision result 900 and a threshold 906 to generate a difference result output 902. A confidence mapping step 912 processes the difference result 902 and generates a segmentation confidence output 904.

In the most basic format, all object segmentation algorithms involve a segmentation decision function with a threshold for each pixel as follows:

$$Seg(x,y)=d\{F[I,(x,y)]-Thr(x,y)\}$$

Where (x,y) is a pixel position

Seg(x,y) is the binary segmentation mask result for pixel position (x,y);

d{a} is an indicator function as follows:

d {a}=1 if a>0 d {a}=0 otherwise

Where I is the input image; F[I, (x,y)] is the segmentation decision function for pixel (x,y) given I. F is different for different segmentation algorithms. Thr(x,y) is the threshold value for pixel (x,y).

A simple segmentation algorithm applying a fixed threshold value T on the image intensity can be expressed in the above formula by setting F[I, (x,y)]=I(x,y) and Thr(x,y)=T. In this case, the segmentation decision function simply outputs image intensity of the corresponding pixel (x,y).

A more sophisticated object segmentation method disclosed in "Lee, Shih-Jong, U.S. Pat. No. 5,867,610, Method for identifying objects using data processing techniques" requires the segmentation decision function, F[I, (x,y)], to be a nonlinear function and Thr(x,y) to be a function of the image pixel location stored as threshold images. Another object segmentation method disclosed in "Lee, Shih-Jong, Oh, Seho, U.S. patent application Ser. No. 10/410,063, Learnable Object Segmentation", which is incorporated in its entirety herein, uses object regions of interest segmentation recipe to guide the object segmentation. In this case, both F and Thr functions are defined by the recipe. F could be a pixel classification function defined by the object regions of interest segmentation recipe and Thr could be a function of pixels as well.

The difference function compares the segmentation decision results and the threshold. In one embodiment of the invention, the difference function is a simple subtraction $$\text{Diff}(x,y) = F[I_s(x,y)] - \text{Thr}(x,y)$$

In another embodiment of the invention, the difference function is an absolute difference. The difference result can be determined for any given object segmentation method having segmentation decision and threshold. The confidence mapping method of this invention applies a confidence function to the values of the difference result as follows:

$$C(x,y) = \text{Conf}(\text{Diff}(x,y))$$

The result of the confidence mapping function is the segmentation confidence. The segmentation confidence for an image of object forms the object segmentation confidence map.

In one embodiment of the invention, the function for confidence mapping can be determined using at least one training image where the desired segmentation result for each pixel is known. The segmentation accuracy can therefore be determined for different distance values using the training images. The empirically determined segmentation accuracy function can be normalized or scaled as the confidence function.

Those skilled in the art should recognize that the empirically determined segmentation accuracy function can be filtered or fitted by Gassian, polynomial or other functions to yield a smooth and well-behaved confidence function.

II.2 Robust Object Feature Measurement

II.2.1 Basic Features

Object feature measurements can be considered the application of estimators to estimate certain attributes of an object. The attributes could be physical characteristics such as size, shape, and density of a cell. Statistical based estimators are often used for the estimation. This results in statistical measurements such as area, mean intensity, etc. Typical calculations for area, mean intensity, and intensity variance can be described as follows:

$$\text{Area: } N = \sum_{(x,y) \in O} 1$$

$$\text{Mean\_intensity: } \mu = \frac{1}{N} \sum_{(x,y) \in O} I(x, y)$$

$$\text{Intensity\_variance: } \sigma^2 = \frac{1}{N-1} \sum_{(x,y) \in O} (I(x, y) - \mu)^2$$

Where O is the object mask.

Those skilled in the art should recognize that other features could be calculated from the data. For example, the higher order statistics of the intensity distributions such as skewness (third order moment) and Kurtosis (fourth order moment) etc. In general, most of the features are derived from the estimation of parameters of the different models for the data.

Those skilled in the art should also recognize that in the case that an object is acquired from multiple image channels. The features could be derived from multiple images. For example the segmentation mask could be derived from one image channel and the measurements from another. Some features may involve the combinations of image intensity values from multiple images.

II.2.2 Confidence Based Measurements

If an object is represented by the segmentation confidence map generated from the robust object segmentation method of the invention, the confidence based measurements can be achieved by weighting each pixel by its confidence value as follows:

$$\text{Area}_c: N_c = \sum_{\forall C(x,y) > 0} C(x, y)$$

$$\text{Mean\_intensity}_c: \mu_c = \frac{1}{N_c} \sum_{\forall C(x,y) > 0} C(x, y) * I(x, y)$$

$$\text{Intensity\_variance}_c: \sigma_c^2 = \frac{1}{N_c - 1} \sum_{\forall C(x,y) > 0} (C(x, y) * I(x, y) - \mu_c)^2$$

Where the pixels used including all pixels having the confidence value $C(x,y) > 0$.

II.2.3 Robust Measurements

Figure 10:
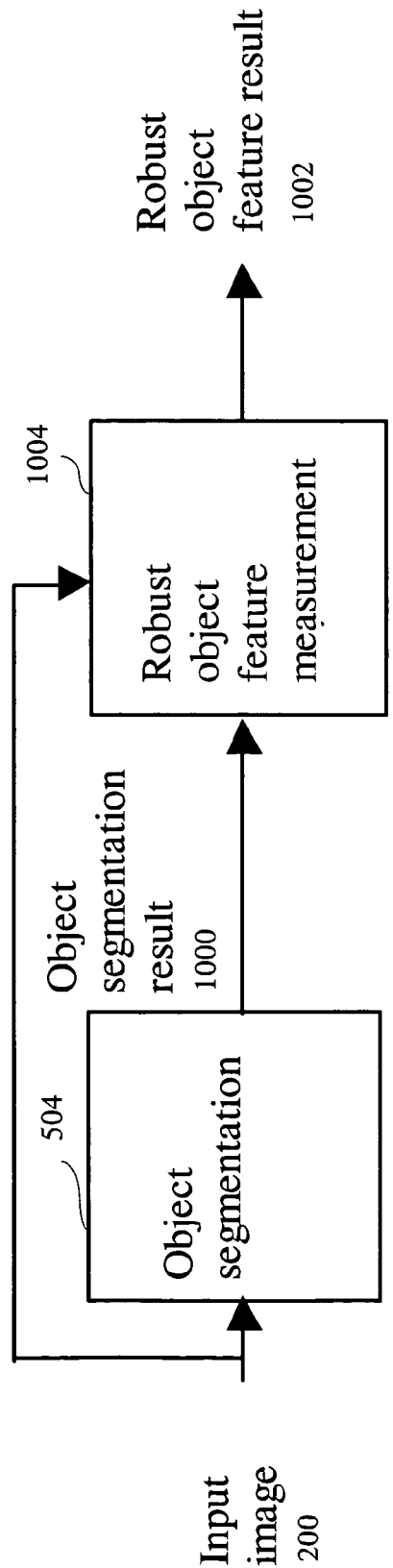
FIG. 10 shows the processing flow for the object level robust analysis method.

The object level robust analysis includes an object segmentation step 504 using input image 200 to generate object segmentation result 1000. This is followed by a robust object feature measurement step 1004 that uses the object segmentation result 1000 and the input image 200 to generate robust object feature result 1002. The processing flow is shown in FIG. 10. The object segmentation method includes robust object segmentation method. In this case, confidence based features could be measured by the robust object feature measurement.

In the general statistical framework, numbers derived from data represent samples of a random variable. The probability distribution of the random variable determines the chance of samples having particular values. We don't know the probability distribution of the random variable, but by sampling it (i.e. by collecting data and making measurements) we try to estimate properties of the random variable and use them for decision making or test of hypotheses. For example, the density (or image intensity) of a cell is a random variable. Intensity data of the cell are samples of the random variable. The average of a group of data (pixel intensities) is not the mean of the random variable; it is (just) an estimate of the true, but unknown, mean of the population.

Most of the basic features such as the average measurement are a good estimate of the true mean under least-squares estimation. This estimation assumes that the noise corrupting the data is of zero mean, which yields an unbiased parameter estimate. Least-squares estimators implicitly assume that the entire set of data can be interpreted by only one parameter vector of a given model. Numerous studies have been conducted, which clearly show that least-squares estimators are vulnerable to the violation of these assumptions. Sometimes even when the data contains only one bad datum, least-squares estimates may be completely perturbed.

The most commonly estimated quantities for a data set are the central tendency and the dispersion of the data.

A. Central Tendency of the Data

Central tendency of the data estimates "around what value is the data centered?" For a random variable with a normal distribution, the best estimate of the underlying mean µ is the average of the data values. For example, the mean_intensity defined in the basic feature set is an average estimate that will yield good result when the random variable is a normal distribution.

Real signals from real data seem to have more outliers than predicted by a Gaussian distribution. The mean of the data will be distorted by an outlier and is not necessarily the best estimate for non-normal data. Robust methods are less sensitive to outliers than are parametric methods.

In one embodiment of the invention, a robust estimation of the intensity central tendency is the median value of the intensity data, when they are ranked. That is:

Median_intensity:$m_0$=Median$\{I(x,y)|\forall(x,y)\epsilon O\}$

The confidence based median intensity could also be calculated:

Median_confidence_intensity:$m_{0c}$=Median$\{C(x,y)*I(x,y)|\forall C(x,y)\epsilon O\}$ In another embodiment of the invention, trimmed means are used for robust feature for central tendency of the data. Trim means calculate the averages of the distribution after certain percentages (for example, 1%, 5%, 10%, etc.) of data have been trimmed from the tails of the distribution. Such means are robust to outliers.

In yet another embodiment of the invention, L-estimates, which are linear combinations of order statistics are used. One "typical" L-estimate is the Tukey's trim mean, defined as the weighted average of the first, second, and third quartile points in a distribution, with weights ¼, ½, and ¼, respectively.

B. Dispersion of the Data

Dispersion of the data estimates "how much does the data spread around its central value?" for a random variable with a Gaussian distribution, a best estimate of the true variance is the estimated variance, $\sigma^2$. For example, the intensity_variance defined in the basic feature set is a variance average estimate that will yield good result when the random variable is a Gaussian distribution.

In one embodiment of the invention, a robust estimate of the data dispersion is the absolute deviation, which is a more robust estimate of the spread for non-Gaussian data. The intensity mean absolute deviation can be calculated as follows:

$$\text{Intensity\_Mean\_AbsDev: } |d| = \frac{1}{N} \sum_{(x,y)\in O} |I(x,y) - m_0|$$

The confidence based intensity absolute deviation could also be calculated:

Intensity_Mean_AbsDev$_c$:

$$|d|_c = \frac{1}{N_c} \sum_{\forall C(x,y)>0} |C(x,y) * I(x,y) - m_{0c}|$$

In another embodiment of the invention, interquartile range: the difference between the 75% ile and the 25% ile values used for robust feature for central tendency of the data. Those skilled in the art should recognize that other robust estimates of the spread such as standard errors and confidence intervals can be used as robust features. They are relatively robust to violations of normality and variance homogeneity.

C. General Features

For other features that are derived from the estimation of parameters of models for the data. The estimation techniques, which is insensitive to small departures from the idealized assumptions such as M-estimates which follow from maximum likelihood considerations can be used in one embodiment of the invention. (NUMERICAL RECIPES IN C: THE ART OF SCIENTIFIC COMPUTING (ISBN 0-521-43108-5) Cambridge University Press 1992, PP. 699-706).

III. FOV Level Robust Analysis

Figure 11:
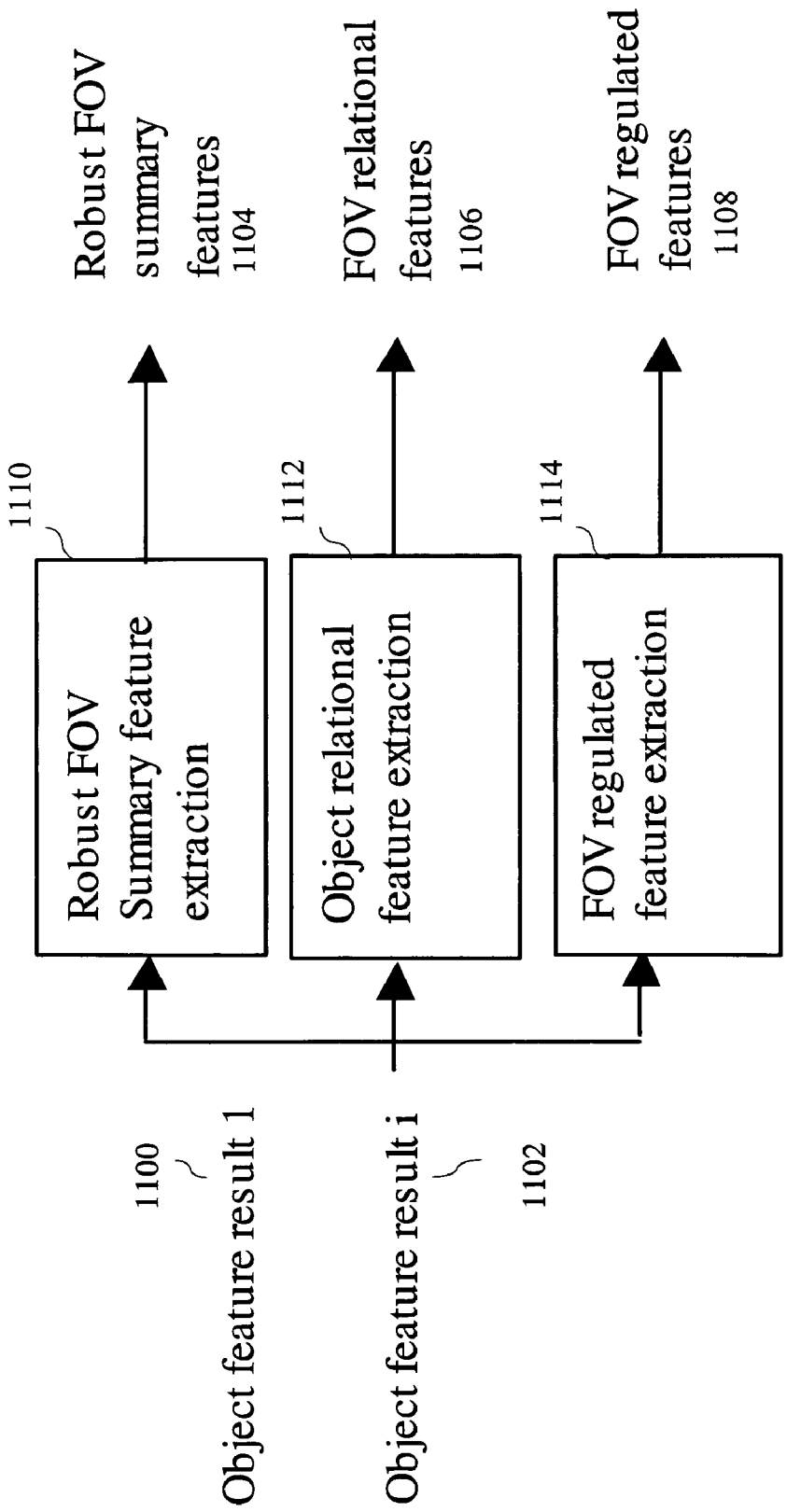
FIG. 11 shows the processing flow for the FOV level robust analysis method.

The FOV level analysis inputs a plurality of the object feature results from the objects belonging to the same FOV. The prior art FOV level analysis method extracts FOV summary features through simple population statistics from the object features. The FOV level robust analysis method performs robust FOV summary feature extraction 1110 using the plurality of object feature results 1100, 1102 as shown in FIG. 11. This results in robust FOV summary features 1104. In addition, FOV relational features 1106 could be extracted using the plurality of object feature results 1100, 1102 by an object relational feature extraction stage 1112 that results in FOV relational features 1106. Furthermore, a FOV regulated feature extraction stage 1114 could be applied to extract FOV regulated features 1108 from the plurality of object feature results 1100, 1102. The processing flow of the FOV level robust analysis method is shown in FIG. 11.

III.1 Robust FOV Summary Feature Extraction

The basic FOV summary features are simple population statistics from the object features. Example features include object counts for each object type that can be calculated as follows:

$$\text{Object\_count}(t): N_t = \sum_{o \in FOV \& T(o)=t} 1$$

Where t is the object type. T(o) is the classification type of object o. FOV is the FOV of interest.

Other example features are the FOV summary statistics of object features. The object features are described in section II.2 such as area, center and dispersion related features, etc. They consist of basic features and robust features. In one embodiment of the invention, the FOV summary statistics include central tendency and dispersion statistics. These include both non-robust and robust statistics.

In one embodiment of the invention, the FOV summary features for an object feature F include the basic central tendency feature (mean) and basic spread feature (variance) of FOV data such as:

$$\text{FOV\_Mean\_F: } \mu^F_{FOV}(t) = \frac{1}{N_t} \sum_{o \in FOV \& T(o)=t} F(o)$$

FOV_Variance_F:

$$\sigma^{2F}_{FOV}(t) = \frac{1}{N_t - 1} \sum_{o \in FOV \& T(o)=t} (F(o) - \mu^F_{FOV}(t))^2$$

The object features F include basic features and robust features for area, intensity center, spread, object shape, intensity contrasts, object intensity distribution statistics, texture, and other object features.

Those skilled in the art should recognize other general summary statistics such as skewness (third order moment) and Kurtosis (fourth order moment) etc. could be used. Also, other features derived from the estimation of parameters of different models could be used.

In another embodiment of the invention, the FOV summary features for an object feature F include the robust central tendency features such as median or trim means that are the averages of the distribution after certain percentages (for example, 1%, 5%, 10%, etc.) of data have been trimmed from the tails of the distribution. Furthermore, Tukey's trim mean, defined as the weighted average of the first, second, and third quartile points in a distribution, with weights ¼, ½, and ¼ can also be used. The trim mean at the p percentage can be defined as follows:

$$\text{FOV\_Trim\_Mean}^p\_F:$$

$$\mu_{FOV}^{pF}(t) = \frac{1}{\sum_{o \in FOV \& T(o) = t \& R(F(o)) > \frac{p}{2} \& R(F(o)) < 1 - \frac{p}{2}} 1} * $$

$$\sum_{o \in FOV \& T(o) = t \& R(F(o)) > \frac{p}{2} \& R(F(o)) < 1 - \frac{p}{2}} F(o)$$

Where R(F(o)) is the rank percentage of the feature F for object o.

The FOV summary features for an object feature F also include the robust dispersion features such as the mean absolute deviation, interquartile range and standard errors.

The current invention includes generalized trimming. The traditional trim means calculate the averages of the distribution after certain percentages (for example, 1%, 5%, 10%, etc.) of data have been trimmed from the tails of the distribution of the feature of interest. The generalized trimming calculates the averages of the distribution after certain percentages of data that meet generalized trimming criteria have been trimmed. The generalized trimming criteria allows the trimming conditions be derived from not only the feature of interest but also from the distributions of other features. For example, the intensity trim mean could condition on trimming the objects whose areas (shapes) are in the tails of the distribution even though intensity is the feature of interest. The trimming criteria could also include combined conditions so that both the objects within the tails of area (or shape) and tails of intensity distributions are excluded from the intensity trim mean calculations. The generalized trimming allows the exclusion of extraneous objects (artifacts) from measurement based on not just pure statistical tail exclusion of the feature of interest. For example, overlapped nuclei have large size (even though the intensity may not fall into the tail of intensity distribution) and therefore are excluded from intensity measurement.

The generalized trim mean for feature F using both the p percentage of F feature and q percentage of Q feature can be defined as follows:

$$\text{FOV\_GTrim\_Mean}^{pq}\_F: \quad \mu_{FOV}^{pqF}(t) = 1$$

$$\frac{}{\sum_{o \in FOV \& T(o) = t \& R(F(o)) > \frac{p}{2} \& R(F(o)) < 1 - \frac{p}{2} \& R(Q(o)) > \frac{q}{2} \& R(Q(o)) < 1 - \frac{q}{1}} 1} * $$

-continued $$\sum_{o \in FOV \& T(o) = t \& R(F(o)) > \frac{p}{2} \& R(F(o)) < 1 - \frac{p}{2} \& R(Q(o)) > \frac{q}{2} \& R(Q(o)) < 1 - \frac{q}{1}} F(o)$$

III.2 Object Relational Feature Extraction

The object relational features characterize relations of multiple sets of objects by comprehensive collections of relational features. A combination of these features could characterize subtle physical, structural or geometrical conditions under the practical arrangements of the object sets and sensing conditions. In one embodiment of the invention, object relational features are the spatial mapping feature set disclosed in U.S. patent application Ser. No. 10/411,437, filed Apr. 9, 2003 and entitled "Intelligent Spatial Reasoning" by Lee, Shih-Jong and Oh, Seho, which is incorporated in its entirety herein.

The spatial mapping feature set includes mean, standard deviation, skewness and kurtosis of the data. The robust statistics could be applied to these feature set to improve the robustness of the object relational features.

For example, the inner distance mean feature could be made robust by using median or trim means instead of simple average. As another example, the inner distance standard deviation feature could be made robust by using mean absolute deviation, interquartile range or standard errors instead of simple standard deviation calculation.

Other Object Relational Features Include

Number of type 1 objects within a distance from a type 2 object

Number of type 1 objects within K nearest neighbors from a type 2 object

Mean (median, trim mean, etc.) area of type 1 objects within a distance from a type 2 object Mean (median, trim mean, etc.) area of type 1 objects within K nearest neighbors from a type 2 object Mean (median, trim mean, etc.) intensity of type 1 objects within a distance from a type 2 object Mean (median, trim mean, etc.) intensity of type 1 objects within K nearest neighbors from a type 2 object Mean (median, trim mean, etc.) contrast of type 1 objects within a distance from a type 2 object Mean (median, trim mean, etc.) contrast of type 1 objects within K nearest neighbors from a type 2 object Mean (median, trim mean, etc.) texture of type 1 objects within a distance from a type 2 object Mean (median, trim mean, etc.) texture of type 1 objects within K nearest neighbors from a type 2 object The above features correspond to each of the type 2 object. Therefore, the robust FOV summary feature as described in section III.1 could be applied to the object relational features to generate the FOV summary object relational features.

III.3 FOV Regulated Feature Extraction

Figure 12:
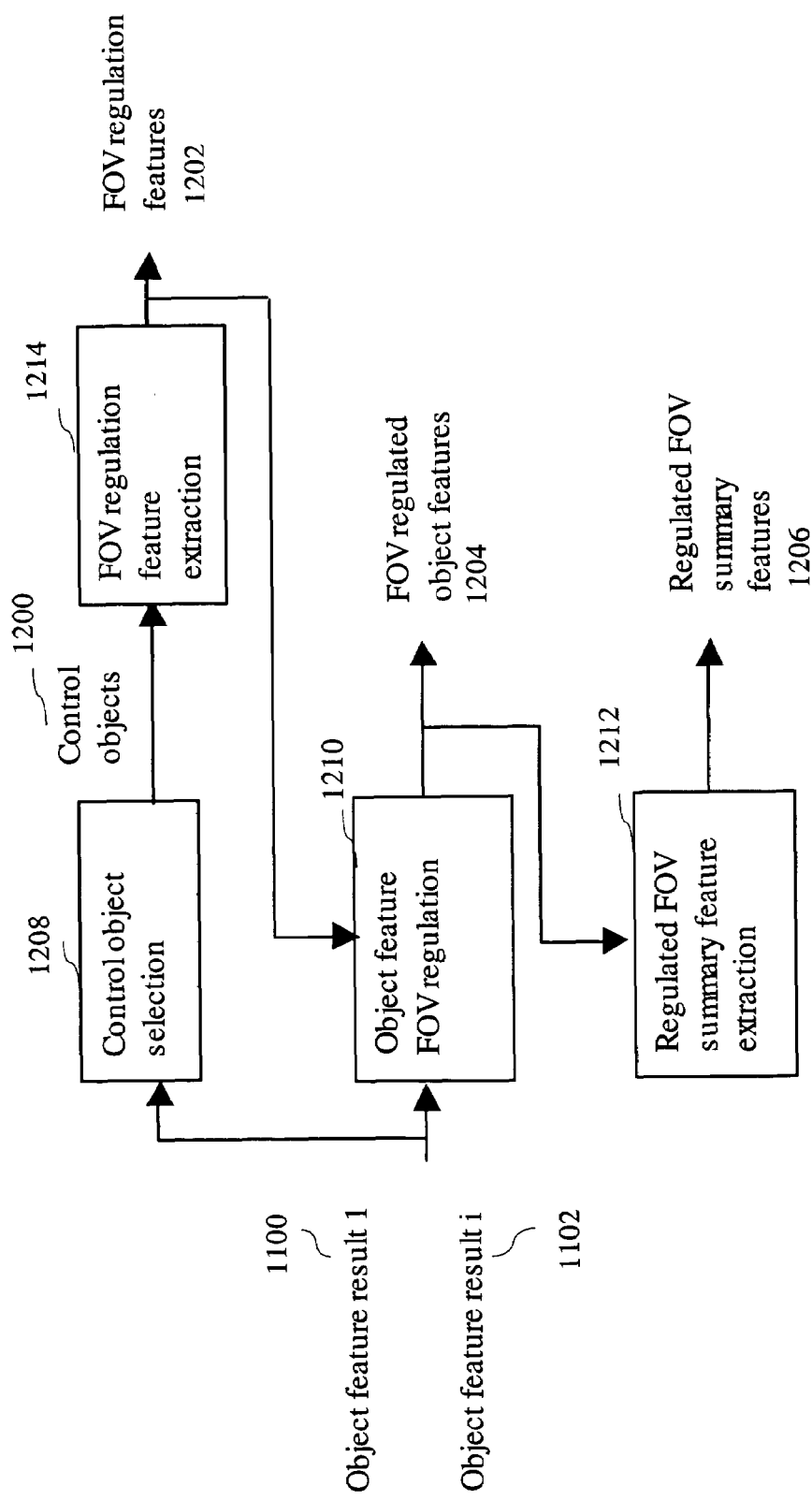
FIG. 12 shows the processing flow for the FOV regulated feature extraction method.

The processing flow of the FOV regulated feature extraction method is shown in FIG. 12. The FOV regulated feature extraction method inputs the object feature results 1100, 1102 from the FOV and performs control object selection step 1208 that selects the control objects 1200 from the FOV object features. The control objects 1200 are used by a FOV regulation feature extraction step 1214 to extract FOV regulation features 1202. The FOV regulation features 1202 are used by an object feature FOV regulation step 1210 to generate FOV regulated object features 1204. The FOV regulated object features 1204 are used by a regulated FOV summary feature extraction step 1212 to generate regulated FOV summary features 1206.

III.3.1 Control Object Selection

In one embodiment of the invention, the control objects could be the specially prepared standard cells. The control objects are selected based on the results of the object classification as shown in FIG. 6. In another embodiment of the invention, the control objects are the reference objects extracted from the object population. In the case, the control objects are selected based on the FOV object feature distribution. For example, the control objects could be the objects having the area and mean intensity within the middle 50% of the distribution within the FOV.

III.3.2 FOV Regulation Feature Extraction

FOV regulation features can be calculated from the object feature results of the control objects for the FOV. In one embodiment of the invention, the FOV summary features are extracted for the FOV regulation features. The FOV summary features that are suitable for the FOV regulation features include center (mean, median, trim mean, generalized trim mean, etc.) and dispersion (variance, mean absolute deviation, range, etc.) for features such as area, intensity, density (log intensity), integrated density, contrast, texture, etc.

III.3.3 Object Feature FOV Regulation

The object feature FOV regulation step regulates the extracted object features to create FOV regulated object features for each of the objects being considered. It inputs an object feature and FOV regulation features and applies FOV regulation formula to the object feature. This results in FOV regulated object feature. In one embodiment of the invention, the FOV regulation feature extraction calculates the formula is as follows:

$$F_{FOV\_r} = \frac{F - \theta R^1_{FOV}}{\gamma + (1-\gamma)R^2_{FOV}}$$

Where F is the input object feature; $\theta$ is a normalization factor; $R^1_{FOV}$ is the first FOV regulation feature such as the center feature; $\gamma$ is a weighting factor between 0 and 1; and $R^2_{FOV}$ is the second FOV regulation feature such as the dispersion feature.

When $\gamma=1$, the FOV regulation includes only the offset of the feature by the first FOV regulation feature. When $\theta=0$ and $\gamma<1$, the FOV regulation includes only the gain adjustment of the feature by the second FOV regulation feature. When $\theta\neq 0$ and $\gamma<1$, the FOV regulation includes both the offset by the first FOV regulation feature and gain adjustment by the second FOV regulation feature.

The object feature FOV regulation allows the removal of the FOV specific bias or background noise and variations. The removal of FOV specific variations would enhance the repeatability and robustness of the FOV level analysis.

III.3.4 Regulated FOV Summary Feature Extraction

The regulated FOV summary feature extraction inputs the FOV regulated object features from a plurality of the objects and generates the regulated FOV summary features. The same procedure as the robust FOV summary feature extraction as described in section III.1 could be applied to the FOV regulated object features to generate the regulated FOV summary features.

IV. Sample Level Robust Analysis

The sample level analysis step processes the FOV results from the FOVs contained in the same sample to create a sample result output. A sample often contains a plurality of FOVs. In one embodiment of the invention, a sample corresponds to a well in a well plate based high throughput/high content screening assays. In another embodiment of the invention, a sample corresponds to a slide in a slide based assays. The sample result could contain one or more of the attributes such as sample object counts, sample object feature population statistics, sample object relational features, sample FOV feature population statistics, etc.

Figure 13:
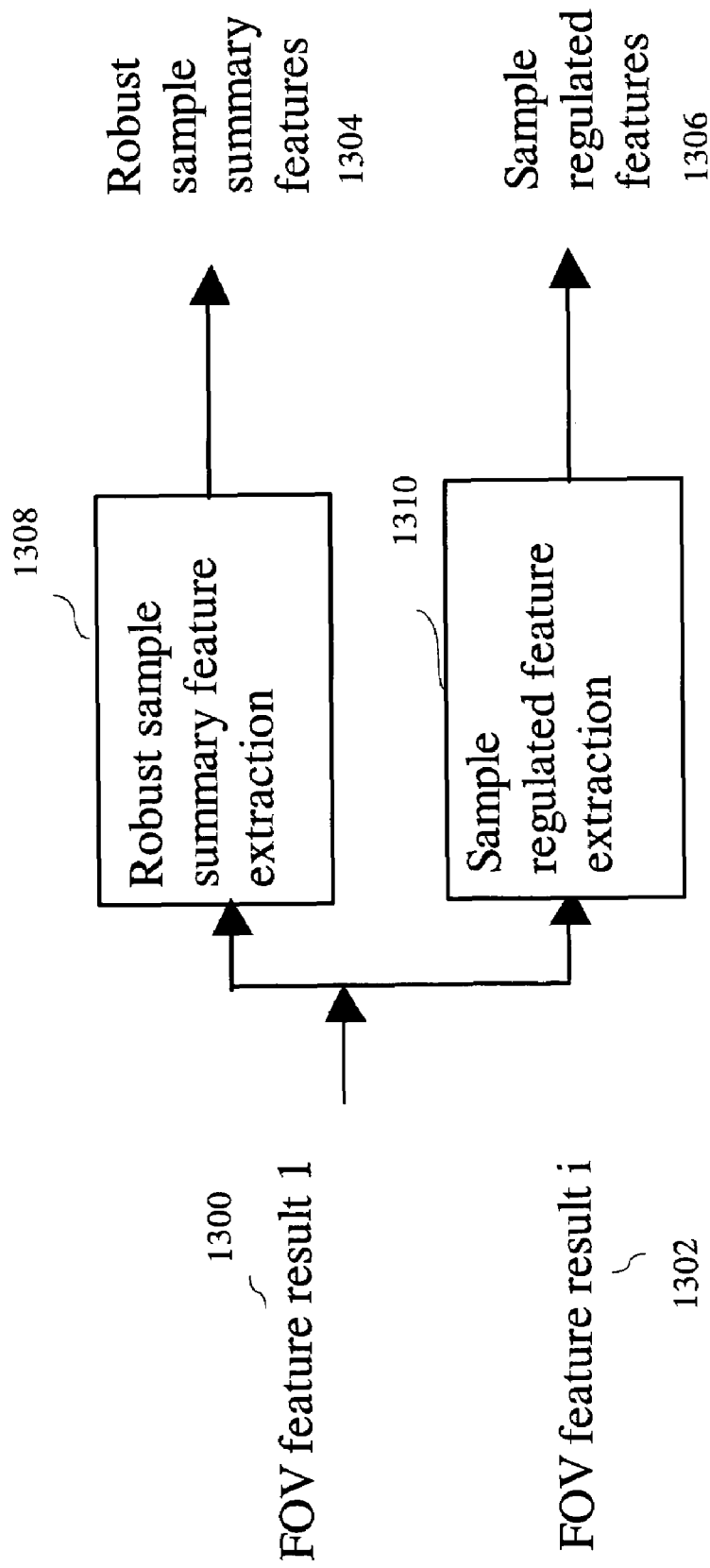
FIG. 13 shows the processing flow for the sample level robust analysis method.

The sample level analysis inputs a plurality of the FOV feature results 1300, 1302 from the FOVs belonging to the same sample. The prior art sample level analysis method extracts sample summary features through simple population statistics from the FOV features. The sample level robust analysis method performs robust sample summary feature extraction 1308 using the plurality of FOV feature results as shown in FIG. 13. This results in robust sample summary features 1304. In addition, a sample regulated feature extraction stage 1310 could be applied to extract sample regulated features 1306 from the plurality of FOV feature results 1300, 1302. The processing flow of the sample level robust analysis method is shown in FIG. 13.

IV.1 Robust Sample Summary Feature Extraction

The basic sample summary features are simple population statistics from the FOV features. Example features include object counts for each object type that can be calculated as follows:

$$\text{Object\_count}^s(t): N^s_t = \sum_{i \in s} \text{Object\_count}(i, t)$$

Where t is the object type and Object_count(i,t) is the type t object count of FOV i belonging to sample s.

Other example features are the sample summary statistics of FOV features. The FOV features are described in section III such as FOV summary features, object relational features, and FOV regulated features, etc. They consist of basic features and robust features. In one embodiment of the invention, the sample summary statistics include central tendency and dispersion statistics. These include both non-robust and robust statistics.

In one embodiment of the invention, the sample summary features for a FOV feature F include the basic central tendency feature (mean) and basic spread feature (variance) of the sample data such as:

$$\text{Sample\_Mean\_F: } \mu^F_{Sample}(t) = \frac{1}{N^s_t} \sum_{i \in s} F(i, t)$$

$$\text{Sample\_Variance\_F: } \sigma^{2F}_{Sample}(t) = \frac{1}{N^s_t - 1} \sum_{i \in s} (F(i, t) - \mu^F_{Sample}(t))^2$$

Those skilled in the art should recognize other summary statistics such as skewness (third order moment) and Kurtosis (fourth order moment) etc. could be included. Also, other features derived from the estimation of parameters of different models could be used.

In another embodiment of the invention, the sample summary features for a FOV feature F include the robust central tendency features such as median or trim means that are the averages of the distribution after certain percentages (for example, 1%, 5%, 10%, etc.) of data have been trimmed from the tails of the distribution. Furthermore, Tukey's trim mean, defined as the weighted average of the first, second, and third quartile points in a distribution, with weights ¼, ½, and ¼ can also be used. The trim mean at the p percentage can be defined as follows:

Sample_Trim_Mean$^p$_F: $\mu^{pF}_{Sample}(t) =$ $$\frac{1}{\sum_{i \in s \& R(F(i)) > \frac{p}{2} \& R(F(i)) < 1 - \frac{p}{2}} Object\_count(i, t)} * \sum_{i \in s \& R(F(i)) > \frac{p}{2} \& R(F(i)) < 1 - \frac{p}{2}} F(i, t)$$

Where R(F(i)) is the rank percentage of the feature F for FOV i.

The sample summary features for a FOV feature F also include the robust dispersion features such as the mean absolute deviation, interquartile range and standard errors.

The current invention includes generalized trimming. The generalized sample trim mean for feature F using both the p percentage of F feature and q percentage of Q feattture can be defined as follows:

Sample_GTrim_Mean$^{pq}$_F: $\mu^{pq\,F}_{Sample}(t) =$ $$\frac{1}{\sum_{i \in s \& R(F(i)) > \frac{p}{2} \& R(F(i)) < 1 - \frac{p}{2} \& R(Q(i)) > \frac{q}{2} \& R(Q(i)) < 1 - \frac{q}{2}} Object\_count(i, t)} *$$

$$\sum_{i \in s \& R(F(i)) > \frac{p}{2} \& R(F(i)) < 1 - \frac{p}{2} \& R(Q(i)) > \frac{q}{2} \& R(Q(i)) < 1 - \frac{q}{2}} F(i, t)$$

IV.2 Sample Regulated Feature Extraction

Figure 14:
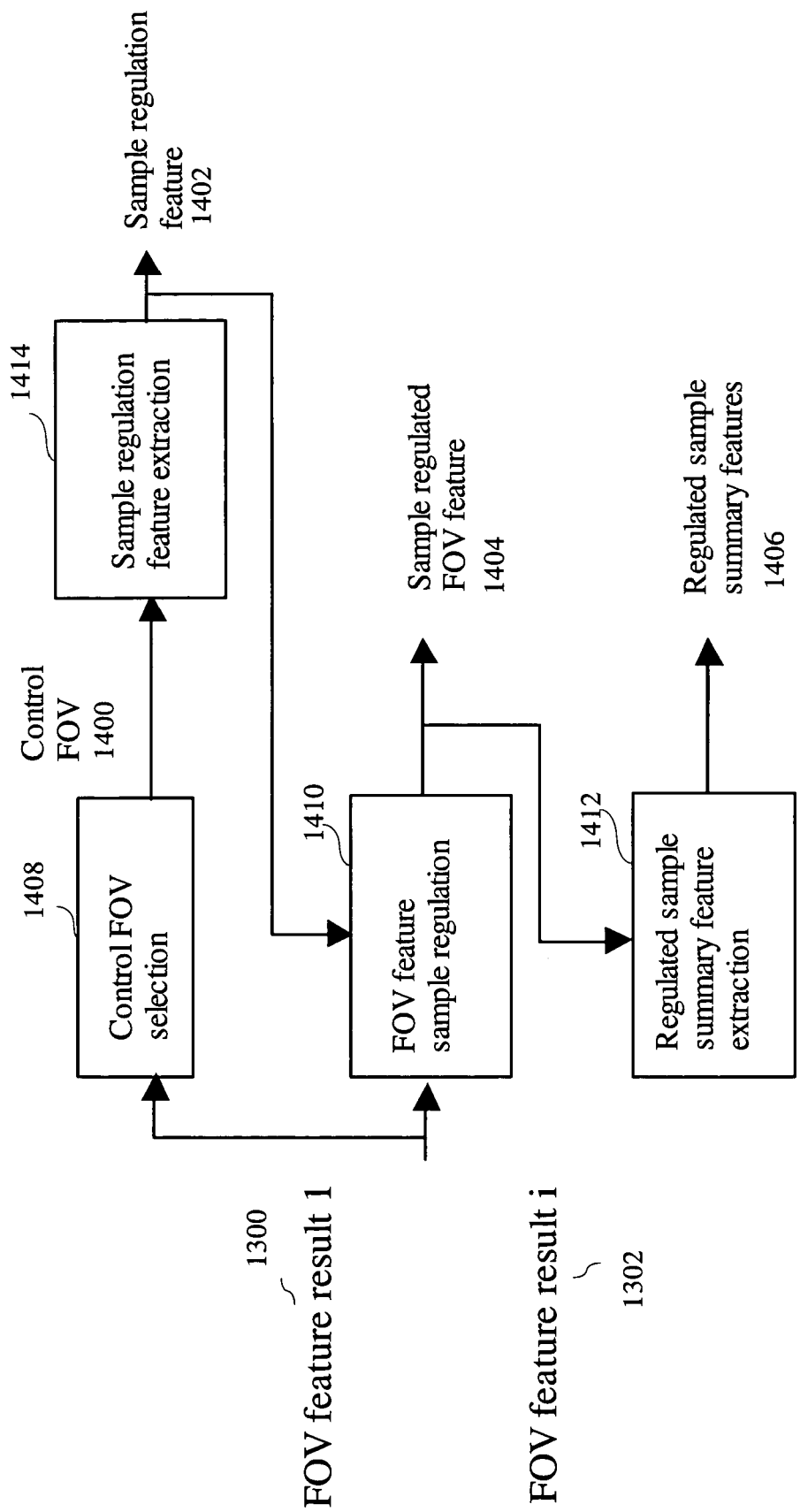
FIG. 14 shows the processing flow for the sample regulated feature extraction method.

The processing flow of the sample regulated feature extraction method is shown in FIG. 14. The sample regulated feature extraction method inputs the FOV feature results 1300, 1302 from the sample and performs control FOV selection step 1408 that selects the control FOV 1400 from the FOV features of the sample. The control FOVs 1400 are used by a sample regulation feature extraction step 1414 to extract sample regulation features 1402. The sample regulation features 1402 are used by an FOV feature sample regulation step 1410 to generate sample regulated FOV features 1404. The sample regulated FOV features 1404 are used by a regulated sample summary feature extraction step 1412 to generate regulated sample summary features 1406.

IV.2.1 Control FOV Selection

In one embodiment of the invention, the control FOV could be the specially prepared standard FOVs. The control FOV are selected based on the assay design. In another embodiment of the invention, the control FOVs are the reference FOVs extracted from the FOV population. In the case, the control FOVs are selected based on the sample FOV feature distribution. For example, the control FOVs could be the FOVs having the area and mean intensity within the middle 50% of the distribution within the sample.

IV.2.2 Sample Regulation Feature Extraction

Sample regulation features can be calculated from the FOV feature results of the control FOVs for the sample. In one embodiment of the invention, the sample summary features are extracted for the sample regulation features. The sample summary features that are suitable for the sample regulation features include center (mean, median, trim mean, generalized trim mean, etc.) and dispersion (variance, mean absolute deviation, range, etc.) for FOV features.

IV.2.3 FOV Feature Sample Regulation

The FOV feature sample regulation step regulated the extracted FOV features to create sample regulated FOV features for each of the FOVs being considered. It inputs a FOV feature and sample regulation features and applied sample regulation formula to the FOV feature. This results in sample regulated FOV feature. In one embodiment of the invention, the sample regulation formula is as follows:

$$F_{Sample\_r} = \frac{F - \theta R^1_{Sample}}{\gamma + (1 - \gamma) R^2_{Sample}}$$

Where F is the input FOV feature; $\theta$ is a normalization factor; $R^1_{Sample}$ is the first sample regulation feature such as the center feature; $\gamma$ is a weighting factor between 0 and 1; and $R^2_{Sample}$ is the second sample regulation feature such as the dispersion feature.

When $\gamma=1$, the sample regulation includes only the offset of the feature by the first sample regulation feature. When $\theta=0$ and $\gamma<1$, the sample regulation includes only the gain adjustment of the feature by the second sample regulation feature. When $\theta \neq 0$ and $\gamma<1$, the sample regulation includes both the offset by the first sample regulation feature and gain adjustment by the second sample regulation feature.

The FOV feature sample regulation allows the removal of the sample specific bias or background noise and variations. The removal of sample specific variations would enhance the repeatability and robustness of the sample level analysis.

IV.2.4 Regulated Sample Summary Feature Extraction

The regulated sample summary feature extraction inputs the sample regulated FOV features from a plurality of the FOVs and generates the regulated sample summary features. The same procedure as the robust sample summary feature extraction as described in section IV.1 could be applied to the sample regulated FOV features to generate the regulated sample summary features.

V. Assay Level Robust Analysis

The assay level analysis step processes the sample results from the samples contained in the same assay to create an assay result output. An assay often contains a plurality of samples. In one embodiment of the invention, an assay corresponds to a 384 well plate in a well plate based high throughput/high content screening assays. In another embodiment of the invention, an assay corresponds to a set of slides in a multiple slide based assays. The assay result could contain one or more of the attributes such as assay object counts, assay object feature population statistics, assay object relational features, assay sample feature population statistics, etc.

Figure 15:
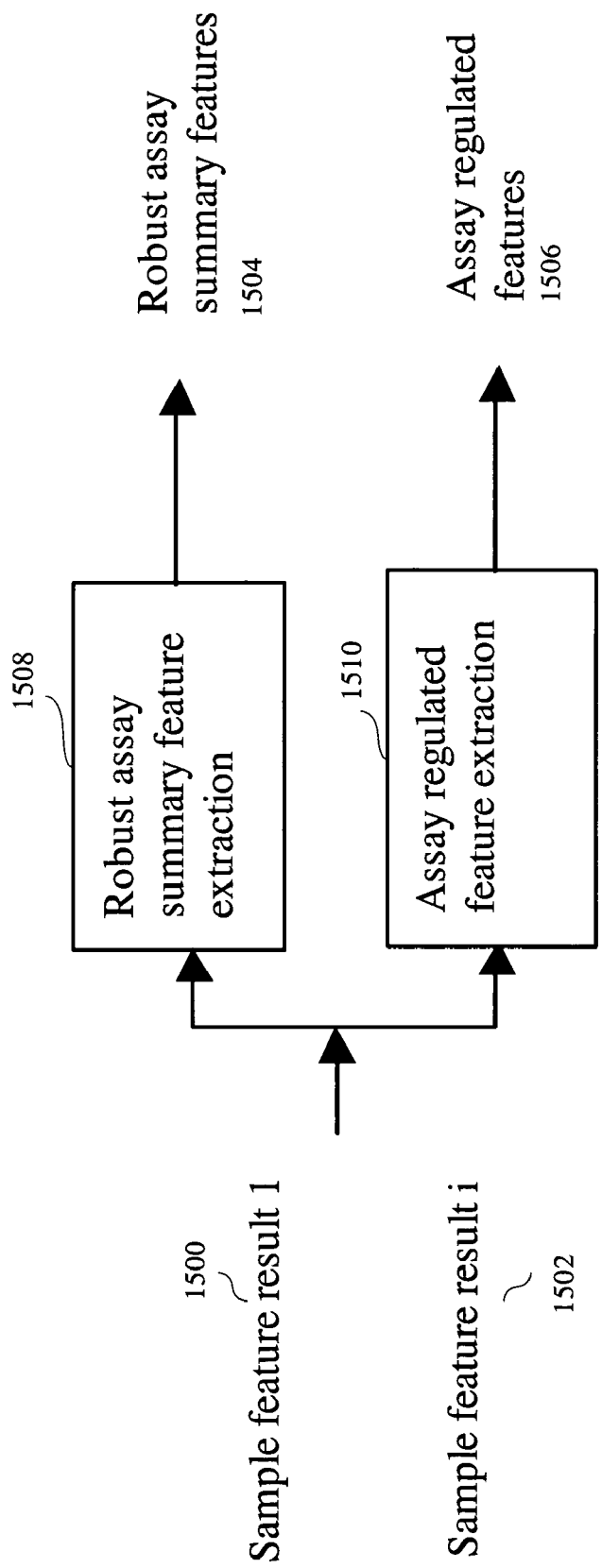
FIG. 15 shows the processing flow for the assay level robust analysis method.

The assay level analysis inputs a plurality of the sample feature results 1500, 1502 from the samples belonging to the same assay. The prior art assay level analysis method extracts assay summary features through simple population statistics from the sample features. The assay level robust analysis method performs robust assay summary feature extraction 1508 using the plurality of sample feature results 1500, 1502 as shown in FIG. 15. This results in robust assay summary features 1504. In addition, an assay regulated feature extraction stage 1510 could be applied to extract assay regulated features from the plurality of sample feature results 1500, 1502. The processing flow of the assay level robust analysis method is shown in FIG. 15.

V.1 Robust Assay Summary Feature Extraction

The basic assay summary features are simple population statistics from the sample features. Example features include object counts for each object type that can be calculated as follows:

$$\text{Object\_count}^a(t): N_t^a = \sum_{s \in a} \text{Object\_count}(s, t)$$

Where t is the object type and Object_count(s,t) is the type t object count of sample s belonging to assay a.

Other example features are the assay summary statistics of sample features. The sample features are described in section IV such as sample summary features and sample regulated features, etc. They consist of basic features and robust features. In one embodiment of the invention, the assay summary statistics include central tendency and dispersion statistics. These include both non-robust and robust statistics.

In one embodiment of the invention, the assay summary features for a sample feature F include the basic central tendency feature (mean) and basic spread feature (variance) of assay data such as:

$$\text{Assay\_Mean\_F}: \mu_{Assay}^F(t) = \frac{1}{N_t^a} \sum_{s \in a} F(s, t)$$

$$\text{Assay\_Variance\_F}: \sigma_{Assay}^{2F}(t) = \frac{1}{N_t^a - 1} \sum_{s \in a} (F(s, t) - \mu_{Assay}^F(t))^2$$

Those skilled in the art should recognize other summary statistics such as skewness (third order moment) and Kurtosis (fourth order moment) etc. could be included. Also, other features derived from the estimation of parameters of different models could be used.

In another embodiment of the invention, the assay summary features for a sample feature F include the robust central tendency features such as median or trim means that are the averages of the distribution after certain percentages (for example, 1%, 5%, 10%, etc.) of data have been trimmed from the tails of the distribution. Furthermore, Tukey's trim mean, defined as the weighted average of the first, second, and third quartile points in a distribution, with weights ¼, ½, and ¼ can also be used. The trim mean at the p percentage can be defined as follows:

$$\text{Assay\_Trim\_Mean}^p\_F: \mu_{Assay}^{pF}(t) =$$

$$\frac{1}{\sum_{s \in a \& R(F(s)) > \frac{p}{2} \& R(F(s)) < 1 - \frac{p}{2}} \text{Object\_count}(s, t)} *$$

-continued $$\sum_{s \in a \& R(F(s)) > \frac{p}{2} \& R(F(s)) < 1 - \frac{p}{2}} F(s, t)$$

Where R(F(s)) is the rank percentage of the feature F for sample s.

The assay summary features for a sample feature F also include the robust dispersion features such as the mean absolute deviation, interquartile range and standard errors.

The current invention includes generalized trimming. The generalized sample trim mean for feature F using both the p percentage of F feature and q percentage of Q feature can be defined as follows:

$$\text{Assay\_GTrim\_Mean}^{pq}\_F: \mu_{Assay}^{pqF}(t) =$$

$$\frac{1}{\sum_{s \in a \& R(F(s)) > \frac{p}{2} \& R(F(s)) < 1 - \frac{p}{2} \& R(Q(s)) > \frac{q}{2} \& R(Q(s)) < 1 - \frac{q}{2}} \text{Object\_count}(s, t)} *$$

$$\sum_{s \in a \& R(F(s)) > \frac{p}{2} \& R(F(s)) < 1 - \frac{p}{2} \& R(Q(s)) > \frac{q}{2} \& R(Q(s)) < 1 - \frac{q}{2}} F(s, t)$$

V.2 Assay Regulated Feature Extraction

Figure 16:
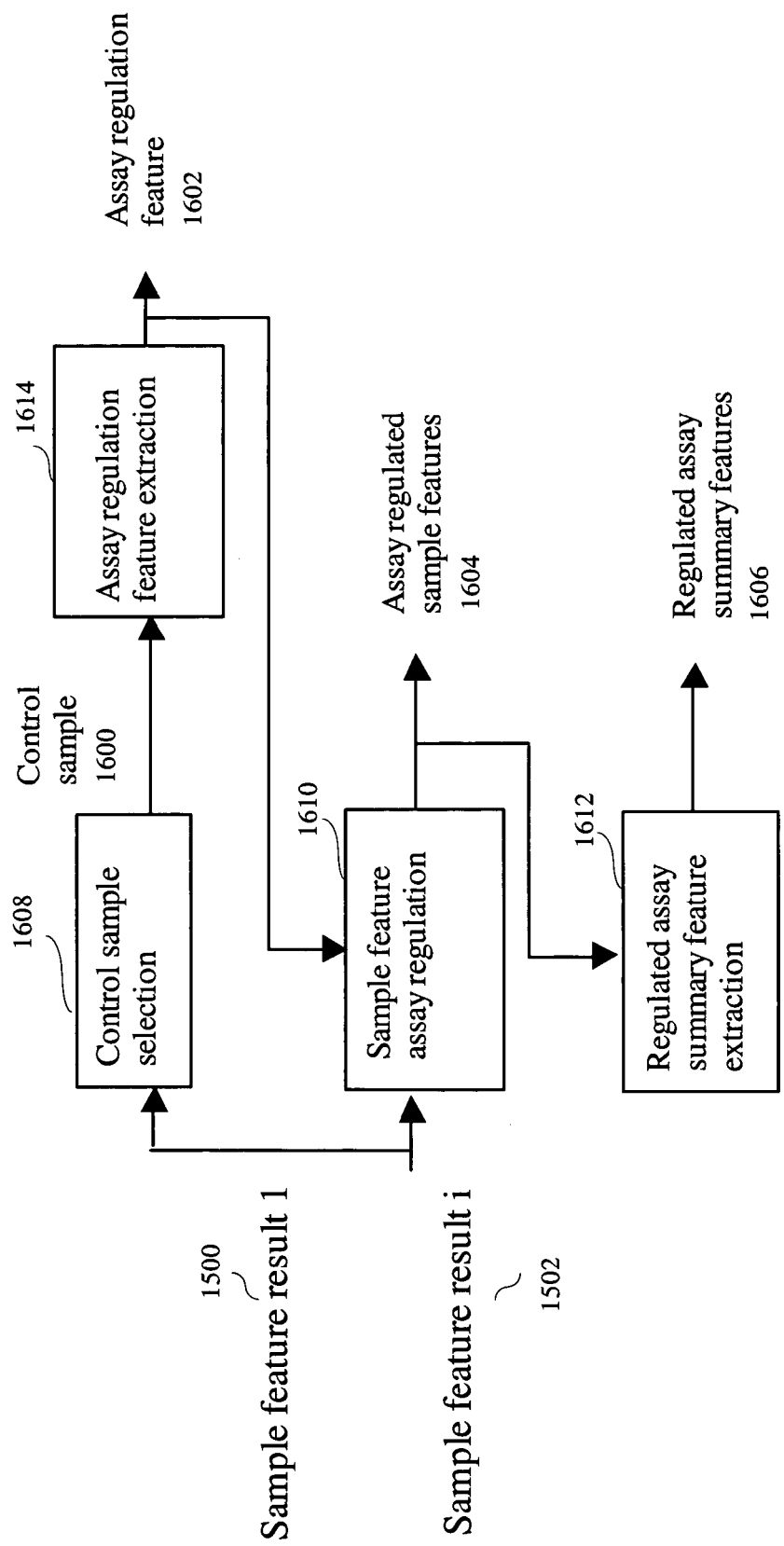
FIG. 16 shows the processing flow for assay regulated feature extraction method.

The processing flow of the assay regulated feature extraction method is shown in FIG. 16. The assay regulated feature extraction method inputs the sample feature results 1500, 1502 from the assay and performs control sample selection step 1608 that selects the control samples 1600 from the sample features of the assay. The control samples 1600 are used by an assay regulation feature extraction step 1614 to extract assay regulation features 1602. The assay regulation features 1602 are used by a sample feature assay regulation step 1610 to generate assay regulated sample features 1604. The assay regulated sample features 1604 are used by a regulated assay summary feature extraction step 1612 to generate regulated assay summary features 1606.

V.2.1 Control Sample Selection

In one embodiment of the invention, the control sample could be the specially prepared standard samples. The control samples are selected based on the assay design. In another embodiment of the invention, the control samples are the reference samples extracted from the sample population. In the case, the control samples are selected based on the assay sample feature distribution. For example, the control samples could be the samples having the area and mean intensity within the middle 50% of the distribution within the assay.

V.2.2 Assay Regulation Feature Extraction

Assay regulation features can be calculated from the sample feature results of the control samples for the assay. In one embodiment of the invention, the assay summary features are extracted for the assay regulation features. The assay summary features that are suitable for the assay regulation features include center (mean, median, trim mean, generalized trim mean, etc.) and dispersion (variance, mean absolute deviation, range, etc.) for sample features.

V.2.3 Sample Feature Assay Regulation

The sample feature assay regulation step regulated the extracted sample features to create assay regulated sample features for each of the samples being considered. It inputs a sample feature and assay regulation features and applied assay regulation formula to the sample feature. This results in assay regulated sample feature. In one embodiment of the invention, the assay regulation formula is as follows:

$$F_{\text{Assay\_r}} = \frac{F - \theta R^1_{Assay}}{\gamma + (1-\gamma)R^2_{Assay}}$$

Where F is the input sample feature; θ is a normalization factor; $R^1_{Assay}$ is the first assay regulation feature such as the center feature; γ is a weighting factor between 0 and 1; and $R^2_{Assay}$ is the second assay regulation feature such as the dispersion feature.

When γ=1, the assay regulation includes only the offset of the feature by the first assay regulation feature. When θ=0 and γ<1, the assay regulation includes only the gain adjustment of the feature by the second assay regulation feature. When θ≠0 and γ<1, the assay regulation includes both the offset by the first assay regulation feature and gain adjustment by the second assay regulation feature.

The sample feature assay regulation allows the removal of the assay specific bias or background noise and variations. The removal of assay specific variations would enhance the repeatability and robustness of the assay level analysis.

V.2.4 Regulated Assay Summary Feature Extraction

The regulated assay summary feature extraction inputs the assay regulated sample features from a plurality of the samples and generates the regulated assay summary features. The same procedure as the robust assay summary feature extraction as described in section V.1 could be applied to the assay regulated sample features to generate the regulated assay summary features.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. An object segmentation confidence mapping method for analysis of biological activity comprising the steps of:
    a) Input an image;
    b) Perform segmentation decision using the input image having the segmentation decision result output;
    c) Input a threshold;
    d) Perform difference operation using the segmentation decision result and the threshold having the difference result output;
    e) Perform confidence mapping using the difference result and a confidence function having the segmentation confidence output wherein the confidence function is determined using at least one training image to determine segmentation accuracy for different distance values wherein the empirically determined segmentation accuracy function is normalized or scaled as the confidence function.

2. A robust object segmentation method for analysis of biological activity comprising the steps of:
    a) Input an image;
    b) Perform segmentation confidence mapping using the input image having the segmentation confidence map output;
    c) Perform thresholding using the object segmentation confidence map having the high confidence object mask output;
    d) Perform another thresholding using the object segmentation confidence map having the low confidence object mask output;
    e) Display object segmentation result using the high confidence object mask;
    f) Perform robust object feature measurement using the low confidence object mask having the robust object features output.

3. The method of claim 2 wherein the object segmentation confidence mapping method further comprises the steps of:
    a) Perform segmentation decision using the input image having the segmentation decision result output;
    b) Input a threshold;
    c) Perform difference operation using the segmentation decision result and the threshold having the difference result output;
    d) Perform confidence mapping using the difference result and a confidence function having the segmentation confidence output wherein the confidence function is determined using at least one training image to determine segmentation accuracy for different distance values wherein the empirically determined segmentation accuracy function is normalized or scaled as the confidence function.

4. A FOV regulated feature extraction method for biological activity comprising the steps of:
    a) Input a plurality of object feature results;
    b) Perform control object selection using the plurality of object feature results having the control objects output;
    c) Perform FOV regulation feature extraction using the control objects having the FOV regulation features output wherein the FOV regulation feature extraction calculates using the following formula:

$$F_{\text{FOV\_r}} = \frac{F - \theta R^1_{FOV}}{\gamma + (1-\gamma)R^2_{FOV}}$$

d) Perform object feature FOV regulation using the plurality of object feature results and the FOV regulation features having the FOV regulated object features output wherein the regulated features is generated using center or dispersion selected control FOVs.

* * * * *